United States Patent
Lee et al.

(10) Patent No.: US 10,088,809 B2
(45) Date of Patent: Oct. 2, 2018

(54) WATCH TYPE TERMINAL AND METHOD OF CONTROLLING THE SAME

(71) Applicant: LG ELECTRONICS INC., Seoul (KR)

(72) Inventors: Yongdeok Lee, Seoul (KR); Mijun Yoo, Seoul (KR); Kwonhan Bae, Seoul (KR); Minjoo Kim, Seoul (KR); Jihye Min, Seoul (KR); Yeehyun Chung, Seoul (KR); Hyekyoung Bu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 14/942,023

(22) Filed: Nov. 16, 2015

(65) Prior Publication Data

US 2016/0320756 A1    Nov. 3, 2016

(30) Foreign Application Priority Data

Apr. 28, 2015 (KR) .................. 10-2015-0059963

(51) Int. Cl.
| | |
|---|---|
| *G04G 9/00* | (2006.01) |
| *G04G 21/08* | (2010.01) |
| *G06F 1/16* | (2006.01) |
| *G06F 3/01* | (2006.01) |
| *G06F 3/0362* | (2013.01) |
| *G06F 3/0481* | (2013.01) |

(Continued)

(52) U.S. Cl.
CPC ............. *G04G 21/08* (2013.01); *G04C 3/001* (2013.01); *G04G 9/00* (2013.01); *G06F 1/163* (2013.01); *G06F 3/017* (2013.01); *G06F 3/0362* (2013.01); *G06F 3/03547* (2013.01); *G06F 3/0482* (2013.01); *G06F 3/04817* (2013.01); *G06F 3/04842* (2013.01); *G06F 3/04845* (2013.01); *G06F 3/04847* (2013.01); *G06F 2203/0339* (2013.01)

(58) Field of Classification Search
CPC .......... G04G 9/00; G04G 21/08; G06F 1/163; G06F 3/017; G06F 3/0362; G06F 3/04817
See application file for complete search history.

(56) References Cited

U.S. PATENT DOCUMENTS

| | | | |
|---|---|---|---|
| 6,556,222 B1 * | 4/2003 | Narayanaswami | G04G 9/0064 368/295 |
| 6,968,508 B2 * | 11/2005 | Lucaci | G06F 1/1626 715/784 |

(Continued)

FOREIGN PATENT DOCUMENTS

KR    10-2008-0030350 A    4/2008

OTHER PUBLICATIONS

Raghunath et al., "User Interface for Applications on a Wrist Watch," Personal and Ubiquitous Computing, vol. 6, pp. 17-30, 2002.*

*Primary Examiner* — Erick J. Bycer
(74) *Attorney, Agent, or Firm* — Birch, Stewart, Kolasch & Birch, LLP

(57) ABSTRACT

A watch type terminal including a body; a display unit disposed on a front surface of the body; a wheel surrounding an outer side of the body, and configured to be turned along the outer side of the body; and a controller configured to display information on the display unit corresponding to an angle and a direction in which the wheel is turned.

20 Claims, 30 Drawing Sheets

(51) Int. Cl.
*G06F 3/0482* (2013.01)
*G06F 3/0484* (2013.01)
*G04C 3/00* (2006.01)
*G06F 3/0354* (2013.01)

(56) References Cited

U.S. PATENT DOCUMENTS

| | | | |
|---|---|---|---|
| 9,348,320 B1* | 5/2016 | Defazio | G04G 11/00 |
| 2007/0211042 A1* | 9/2007 | Kim | G04C 3/005 |
| | | | 345/184 |
| 2008/0081594 A1 | 4/2008 | Lee | |
| 2008/0207274 A1 | 8/2008 | Kim | |
| 2009/0059730 A1* | 3/2009 | Lyons | G04G 21/08 |
| | | | 368/69 |
| 2010/0162170 A1 | 6/2010 | Johns et al. | |
| 2011/0070924 A1 | 3/2011 | Kim | |
| 2013/0104079 A1* | 4/2013 | Yasui | G06F 3/0482 |
| | | | 715/834 |
| 2014/0143678 A1 | 5/2014 | Mistry et al. | |
| 2014/0347289 A1* | 11/2014 | Suh | G06F 3/017 |
| | | | 345/173 |
| 2016/0054892 A1* | 2/2016 | Kim | G04G 9/007 |
| | | | 715/808 |
| 2016/0085216 A1* | 3/2016 | Wang | G04G 21/04 |
| | | | 368/47 |
| 2016/0179353 A1* | 6/2016 | Iskander | G06F 3/04847 |
| | | | 715/765 |

* cited by examiner

WATCH TYPE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0059963, filed on Apr. 28, 2015, the contents of which is incorporated by reference herein in its entirety.

BACKGROUND OF THE DISCLOSURE

1. Field of the Disclosure

The present disclosure relates to a watch type terminal surrounding a user's wrist and a method of controlling the same.

2. Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, users hold and use a mobile terminal, and moreover, mobile terminals have advanced to wearable devices wearable on a body of a user. An example of the wearable devices may include watch type terminals. The watch type terminals can output various pieces of visual information. However, since the watch type terminals are limited in size, the watch type terminals should restrictively include a touch button or a push button for controlling visual information which is displayed.

SUMMARY OF THE DISCLOSURE

Therefore, an aspect of the detailed description is to provide a watch type terminal and a method of controlling the same, which turn a wheel surrounding an outer side of a body to control visual information which is displayed.

To achieve these and other advantages and in accordance with the purpose of this specification, as embodied and broadly described herein, a watch type terminal including: a body; a display unit disposed on a front surface of the body to display visual information; a wheel disposed to surround an outer side of the body, the wheel being turned at a certain angle along the outer side of the body according to a magnitude of an external force of turning the wheel; and a control unit configured to control the display unit to display visual information corresponding to an angle by which the wheel is turned and a direction in which the wheel is turned, based on the external force of turning the wheel being applied to the watch type terminal.

In another aspect of the present invention, a method of controlling a watch type terminal includes: (a) sensing an external force applied to a wheel that is turned at a certain angle along an outer side of a body according to a magnitude of the external force of turning the wheel, the wheel being disposed to surround the outer side of the body; and (b) controlling a display unit to display visual information corresponding to an angle by which the wheel is turned and a direction in which the wheel is turned, based on the external force of turning the wheel being sensed.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings.

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers and a digital signage.

Figure 1A:
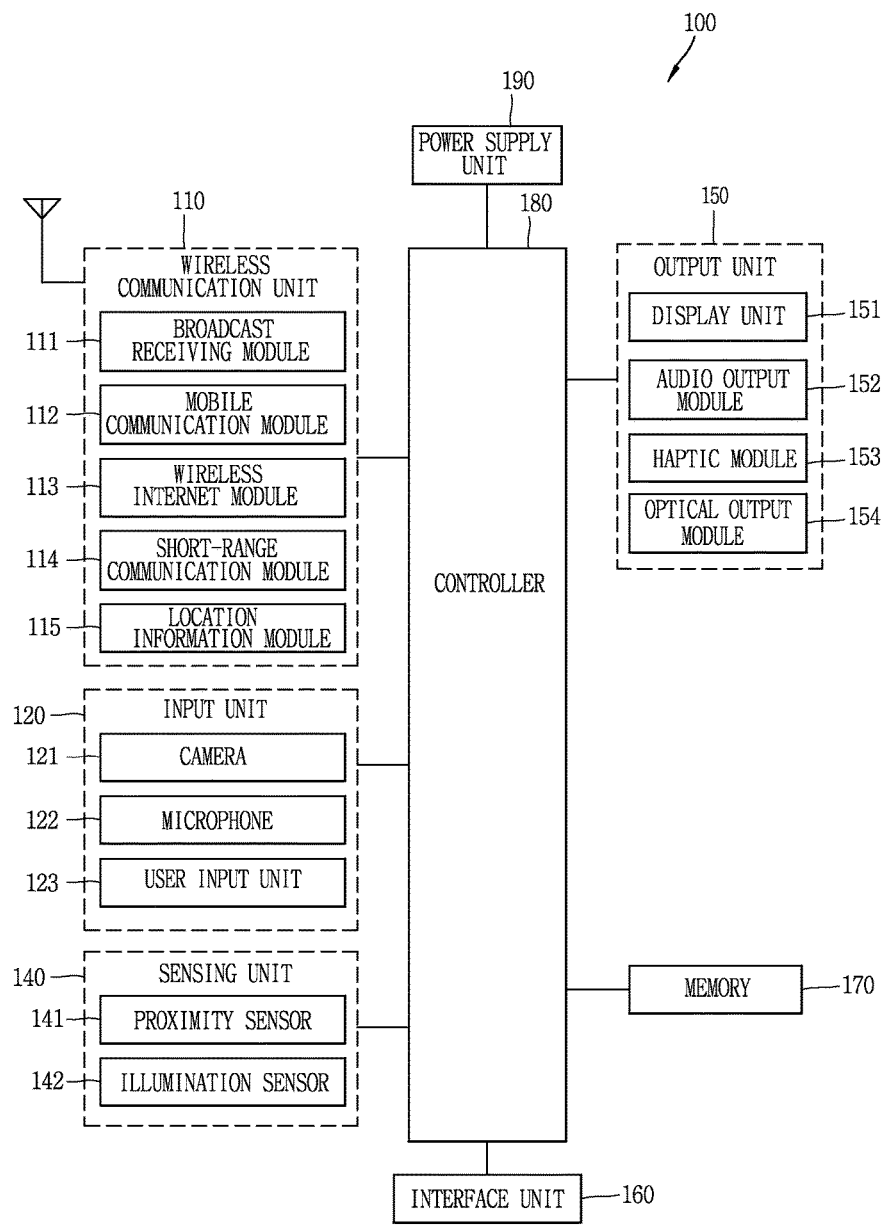
FIG. 1A is a block diagram illustrating a mobile terminal according to an embodiment of the present invention.
Figure 1B:
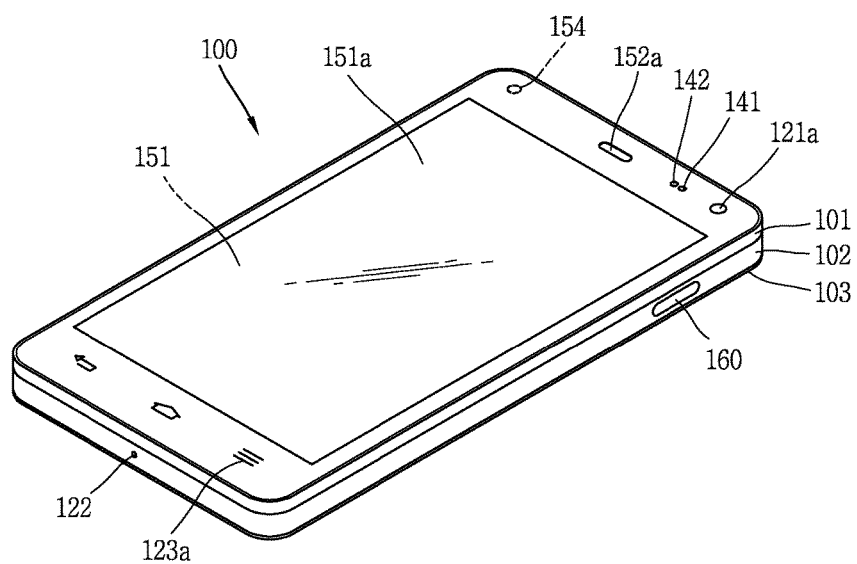
FIGS. 1B and 1C are conceptual diagrams illustrating an example of a mobile terminal according to an embodiment of the present invention when seen in different directions.
Figure 1C:
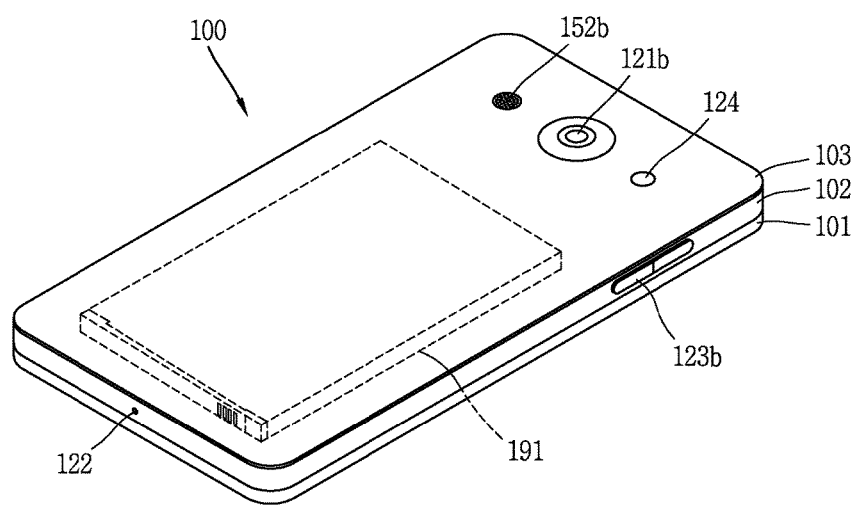

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112. The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZIGBEE, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset activation period of the touch sensor is shorter, a sensing speed with respect to taps applied onto the display unit 151 is higher. However, in this instance, a power consumption amount of the touch sensor may be increased. Further, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second. While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'KNOCK-KNOCK' touch input) is sensed by the touch sensor, the controller 180 can convert the doze mode into an activate mode where the display unit and the touch sensor are activated. Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more details, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner. Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100. An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
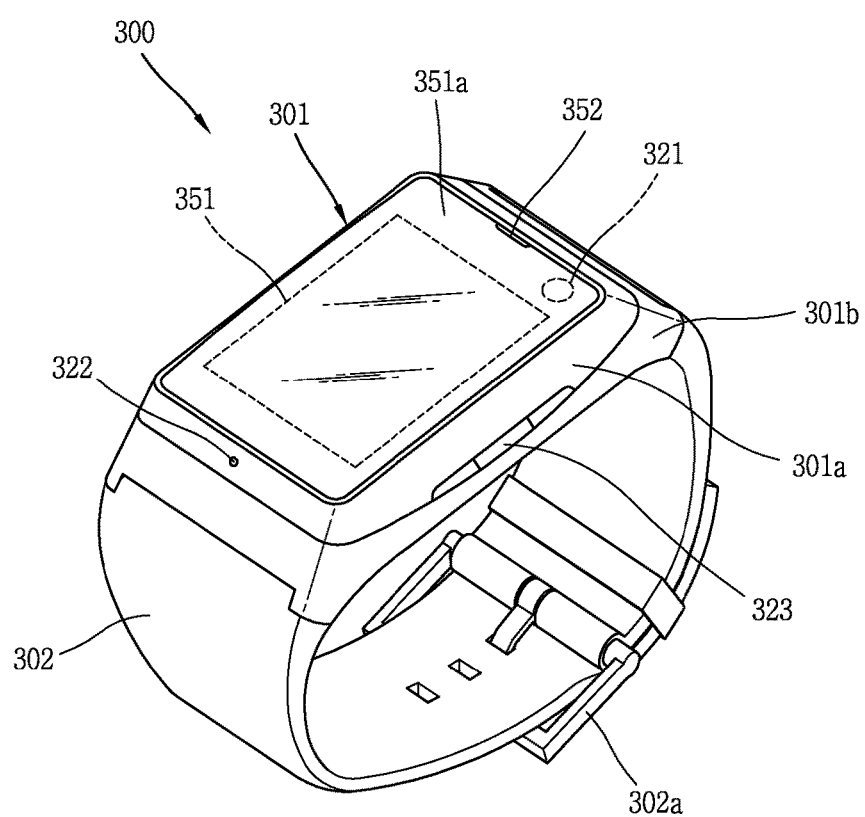
FIG. 2 is a perspective view illustrating an example of a watch type terminal according to another embodiment of the present invention.

FIG. 2 is a perspective view illustrating one example of a watch-type mobile terminal 300 in accordance with another embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference. In one configuration, the band 302 may be used for extending the performance of the antenna. For example, the band may include therein a ground extending portion electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
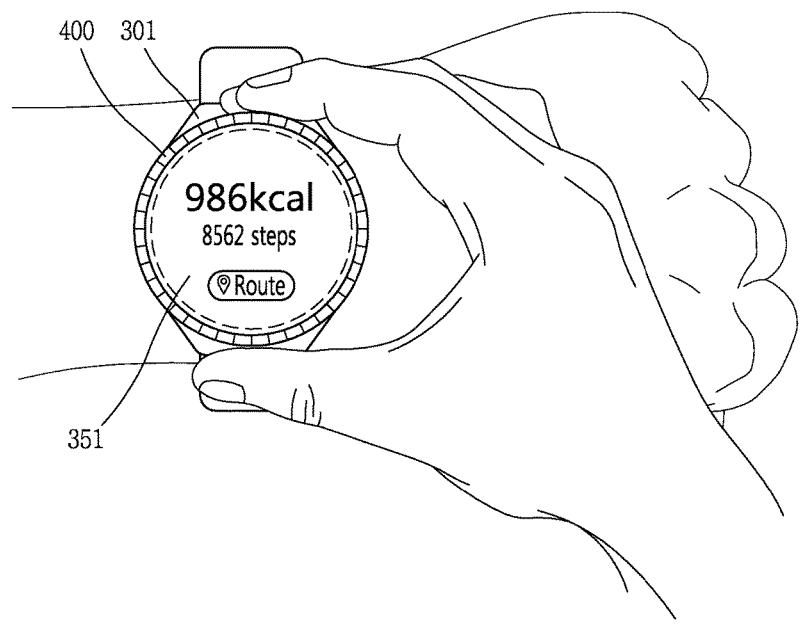
FIG. 3 is a conceptual diagram illustrating an example of a motion of turning a wheel of a watch type terminal according to an embodiment of the present invention.

FIG. 3 is a conceptual diagram illustrating an example of a motion of turning a wheel 400 of a watch type terminal according to an embodiment of the present invention. Referring to FIG. 3, the wheel 400 surrounds an outer side of a body 301. The wheel 400 may be rotated at a certain angle, based on the degree of an external force of turning the outer side.

For example, a user can turn the wheel 400 clockwise or counterclockwise. In this instance, the user can adjust a degree to which the wheel 400 is turned, based on a magnitude of an external force applied to the wheel 400 or a time for which the external applied is maintained. Moreover, a the controller 180 can control a display unit 351 to display visual information corresponding to an angle by which the wheel 400 is turned and a direction in which the wheel 400 is turned, based on an external force of turning the wheel 400 being applied.

In an embodiment, visual information displayed by the display unit 351 is changed based on the visual information currently displayed, a direction in which the wheel 400 is turned, and a degree to which the wheel 400 is turned. In another embodiment, a plurality of wheels surrounding the outer side of the body 301 may be disposed in layers. In this instance, visual information displayed by the display unit 351 may be changed based on visual information which is being currently displayed, a wheel selected from among the plurality of wheels, a direction in which the selected wheel is turned, a degree to which the selected wheel is turned, and/or the like.

In another embodiment, the wheel 400 may include a touch sensor or a button. Therefore, the user can apply a touch input to a certain region or press the button to allow a predetermined control command to be executed. In another embodiment, first visual information which is displayed by turning the wheel 400 in a specific direction may be changed to second visual information, and then, an input that turns the wheel 400 in a direction opposite to the specific direction may be applied to the watch type terminal. Therefore, the second visual information may be again changed to the first visual information.

Figure 4:
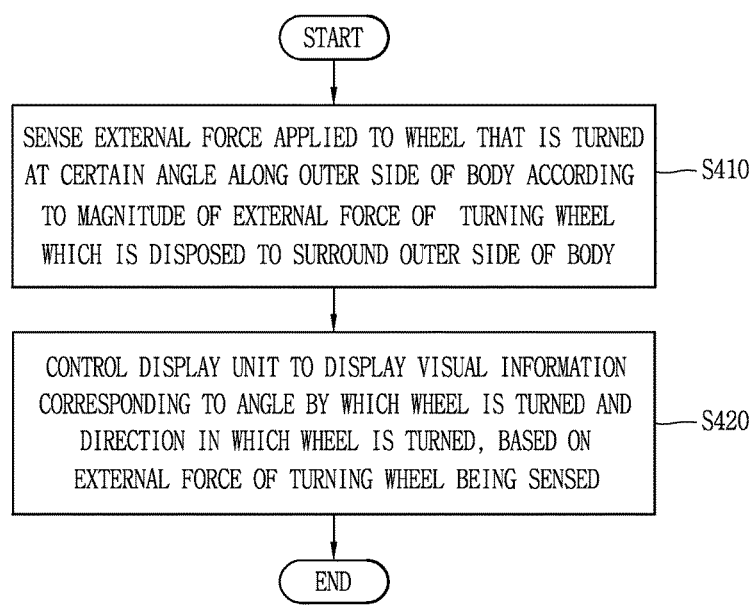
FIG. 4 is a flowchart illustrating a method of controlling a watch type terminal according to an embodiment of the present invention.

FIG. 4 is a flowchart illustrating a method of controlling a watch type terminal according to an embodiment of the present invention. Referring to FIG. 4, first, the wheel 400 surrounds the outer side of the body 301, and in operation S410, the watch type terminal senses an external force applied to the wheel 400 which rotates at a certain angle according to a magnitude of the external force of turning the wheel 400 along the outer side of the body 301.

In addition, in operation S420, the watch type mobile terminal can control the display unit 351 to display visual information corresponding to an angle by which the wheel 400 is turned and a direction in which the wheel 400 is turned, based on the external force of turning the wheel 400 being sensed. In an embodiment, operation S410 may include controlling the display unit 351 to display an indicator indicating a time and a plurality of circles that respectively correspond to a plurality of predetermined subjects and have different sizes.

Moreover, an object corresponding to an event included in each of the plurality of subjects may be displayed on a circle corresponding to one of the plurality of subjects, based on the indicator indicating a time. In an embodiment, operation S420 may include an operation of controlling the display unit 351 to display some of the plurality of circles, based on the angle by which the wheel 400 is turned by the external force of turning the wheel 400 and the direction in which the wheel 400 is turned.

In another embodiment, operation S420 may include an operation of setting a method of displaying the some circles and a method of displaying an object corresponding to an event displayed on each of the some circles, based on the angle by which the wheel 400 is turned by the external force of turning the wheel 400 and the direction in which the wheel 400 is turned.

In another embodiment, operation S420 may include an operation of controlling the display unit 351 to display a circle corresponding to a predetermined application and to display an icon, corresponding to an event which occurs in association with the application, on the circle with respect to an indicator indicating a time when the event occurs, based on the angle by which the wheel 400 is turned by the external force of turning the wheel 400 and the direction in which the wheel 400 is turned.

In another embodiment, operation S420 may include an operation of setting at least one of a method of arranging a plurality of icons corresponding to a plurality of applications, sizes of the plurality of icons, and the number of icons which are displayed, based on the angle by which the wheel 400 is turned by the external force of turning the wheel 400 and the direction in which the wheel 400 is turned.

In another embodiment, operation S420 may include an operation where while a plurality of objects which are generated during a predetermined first period are being displayed, the display unit 351 is controlled to display only objects, which are generated during a second period included in the first period, among the generated plurality of objects, based on the angle by which the wheel 400 is turned by the external force of turning the wheel 400 and the direction in which the wheel 400 is turned.

In another embodiment, operation S420 may include an operation of setting a user input value associated with the predetermined application, based on the angle by which the wheel 400 is turned by the external force of turning the wheel 400 and the direction in which the wheel 400 is turned. In another embodiment, operation S420 may include an operation of controlling the display unit 351 to display an information value, which is changed with time, with respect to the indicator indicating a time, based on the angle by which the wheel 400 is turned by the external force of turning the wheel 400 and the direction in which the wheel 400 is turned.

In another embodiment, operation S420 may include an operation of controlling the display unit 351 to enlarge and display visual information which is being displayed on a certain region of the display unit 351, based on a user input that selects the certain region, the angle by which the wheel 400 is turned by the external force of turning the wheel 400, and the direction in which the wheel 400 is turned. In another embodiment, operation S420 may include an operation of controlling the display unit 351 to display second visual information while first visual information is being displayed, based on the angle by which the wheel 400 is turned by the external force of turning the wheel 400 and the direction in which the wheel 400 is turned.

In addition, while the second visual information is being displayed, the controller 180 can control the display unit 351 to again display the first visual information, based on the wheel 400 being turned in a direction opposite to the direction according to the external force of turning the wheel 400.

Hereinafter, embodiments associated with a control method implementable for a mobile terminal having the above-described configuration will be described. It is obvious to those skilled in the art that the present invention is implemented in another specific form without departing from the scope and essential feature of the present invention. The controller 180 can control the display unit 351 to display an indicator indicating a time and a plurality of circles that respectively correspond to a plurality of predetermined subjects and have different sizes.

An indicator indicating a time may be a number or a calibration which is displayed on an edge of a screen of the display unit 351. Each of the plurality of subjects may be a superordinate concept for classifying an event and may include an application. For example, a plurality of circles that respectively correspond to a plurality of applications and have different sizes. Moreover, the controller 180 can control the display unit 351 to display an object, corresponding to an event included in each of the plurality of subjects, on a circle corresponding to one of the plurality of subjects, based on the indicator indicating a time. In this instance, the object corresponding to the event may include an icon, a thumbnail image, a text, and/or the like.

Figure 5A:
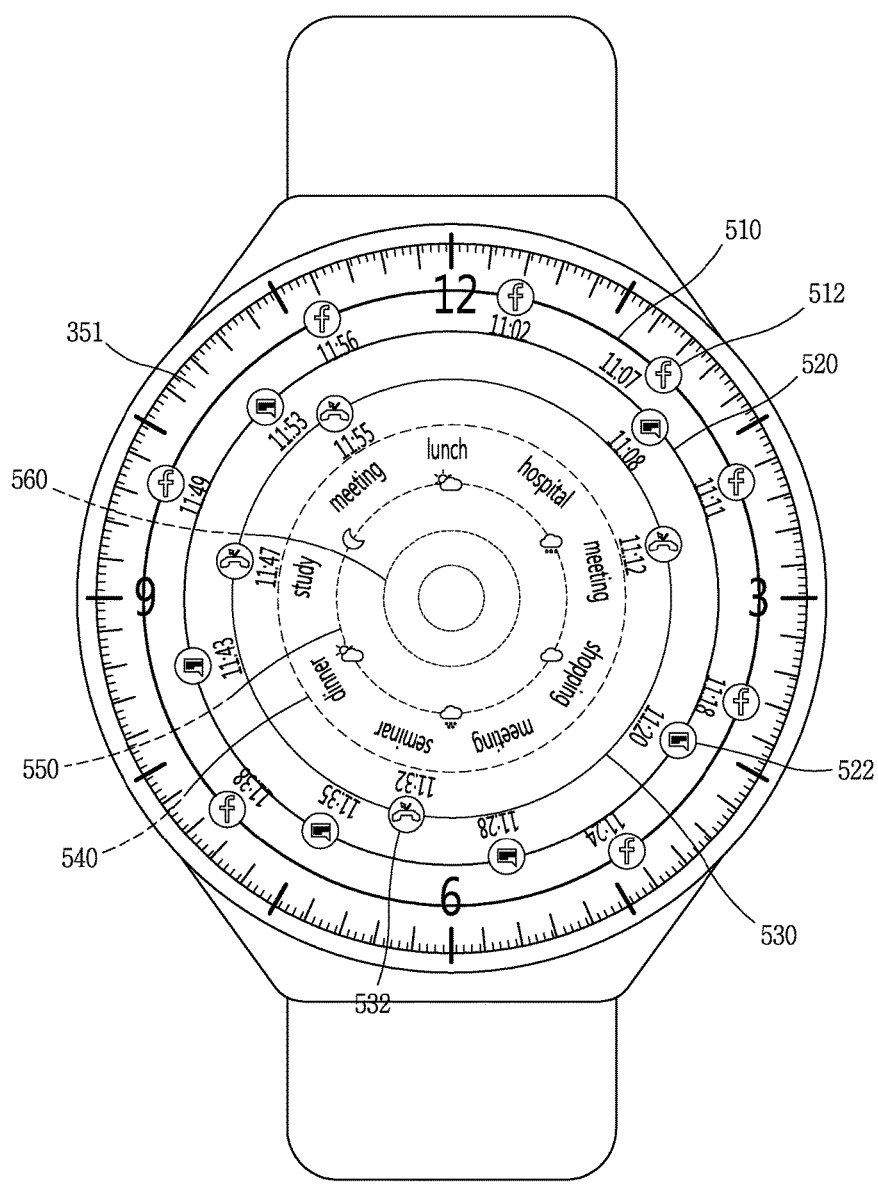
FIGS. 5A, 5B and 5C are conceptual diagrams illustrating an embodiment where objects corresponding to a plurality of circles and events are displayed.
Figure 5B:
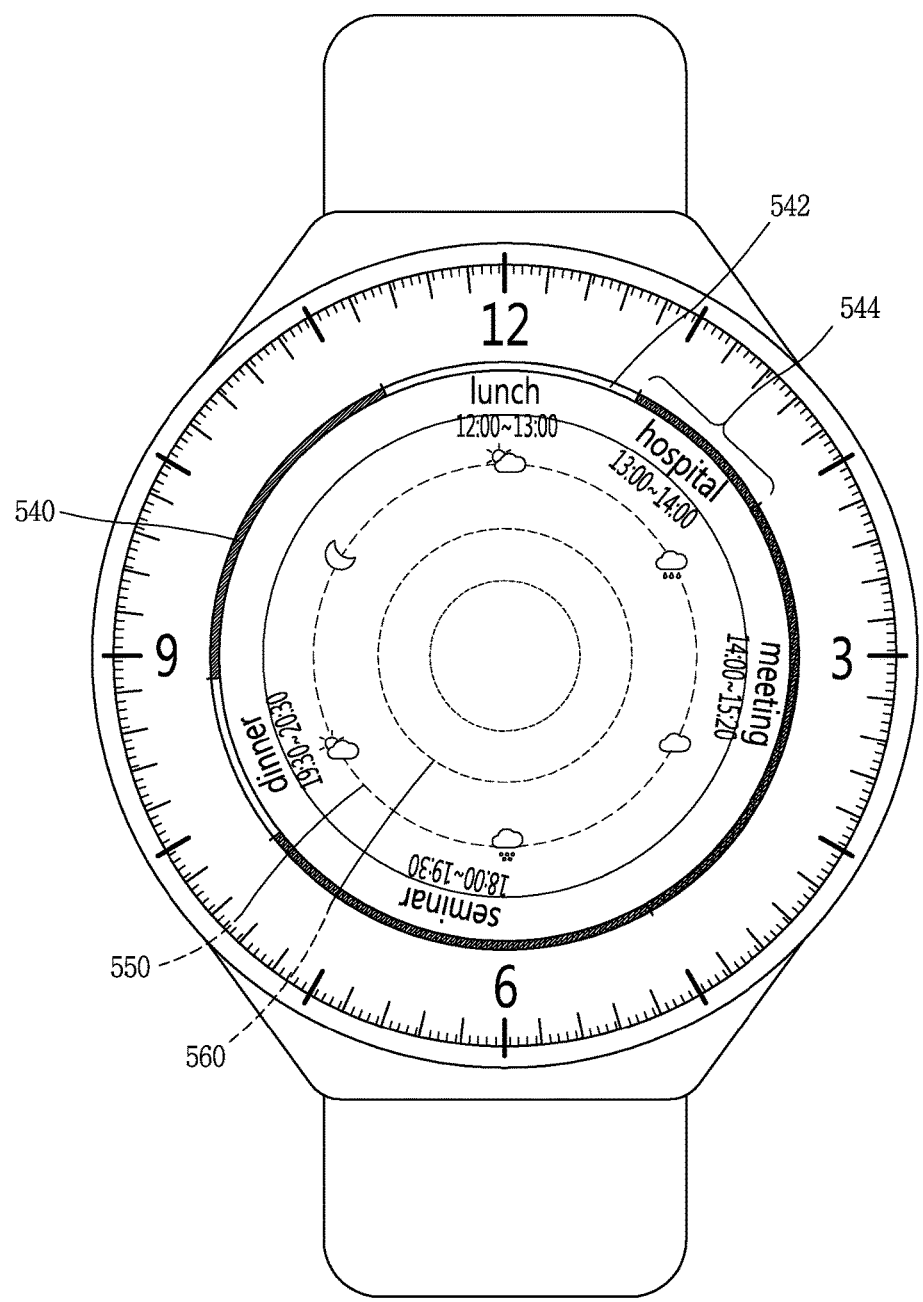
Figure 5C:
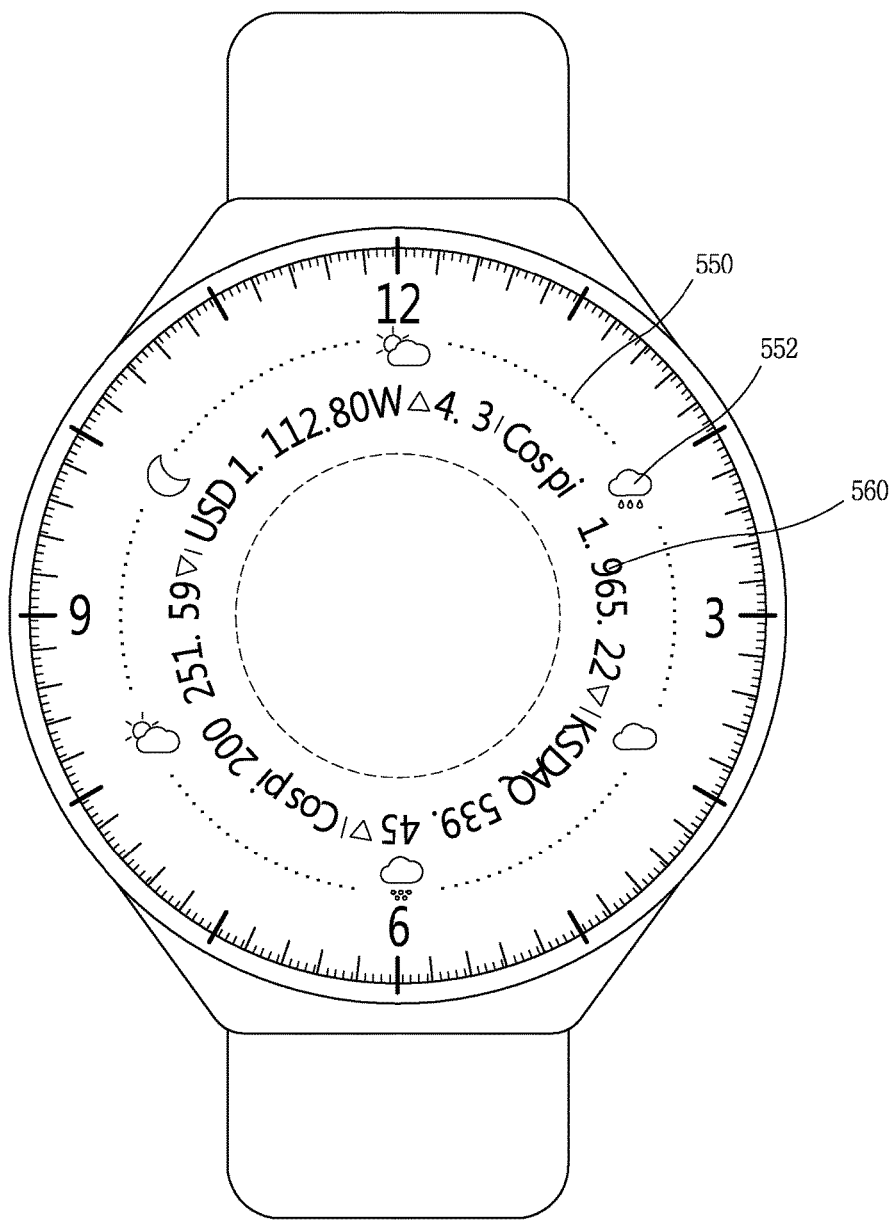

Next, FIGS. 5A, 5B and 5C are conceptual diagrams illustrating an embodiment where objects corresponding to a plurality of circles and events are displayed. Referring to FIG. 5A, a calibration and a number representing a time is displayed on an edge of a screen of the display unit 351. Also, a plurality of circles 510, 520, 530, 540, 550 and 560 that respectively correspond to a plurality of predetermined subjects and have different sizes may be displayed. In this instance, the number, kinds, sizes, order, colors, sharpness, etc. of displayed circles may be previously set, or may be selected and set by a user.

In an embodiment, a first subject may be defined as a superordinate concept for classifying an event that occurs in association with a social network service (SNS) application. Therefore, a plurality of icons corresponding to the event which occurs in the SNS application may be displayed on a first circle 510, based on an indicator indicating a time. In more detail, when new posting is wrote on the SNS application at 11:07 a.m., an icon indicating that the new posting has written may be displayed on a region 512 on the first circle 510 corresponding to 11:07 a.m. Also, a time when the new posting is written may be displayed on a region adjacent to the icon.

In another embodiment, a second subject may be defined as a superordinate concept for classifying an event that occurs in association with a messenger application. Therefore, a plurality of icons corresponding to the event which occurs in the messenger application may be displayed on a second circle 520, based on an indicator indicating a time. In more detail, when a new message is received through the messenger application at 11:20 a.m., an icon indicating that the new message has received may be displayed on a region 522 on the second circle 520 corresponding to 11:20 a.m. Also, a time when the new message is received may be displayed on a region adjacent to the icon.

In another embodiment, a third subject may be defined as a superordinate concept for classifying a missed call reception event. Therefore, a plurality of icons corresponding to the missed call reception event may be displayed on a third circle 530, based on an indicator indicating a time. In more detail, when a missed call is received at 11:32 a.m., an icon indicating that the missed call has received may be displayed on a region 532 on the third circle 530 corresponding to 11:32 a.m. Also, a time when the missed call is received may be displayed on a region adjacent to the icon.

In another embodiment, a fourth subject may be defined as a superordinate concept for classifying an event that occurs in association with a schedule management application. Therefore, details that are stored as a today's schedule may be displayed on a fourth circle 540, based on an indicator indicating a time. In another embodiment, a fifth subject may be defined as weather information based on a time. Therefore, a plurality of icons showing the weather information may be displayed on a fifth circle 550, based on an indicator indicating a time.

In another embodiment, a sixth subject may be defined as financial information. Therefore, pieces of financial information may be displayed on a sixth circle 560. In this instance, the fourth to sixth circles 540, 550 and 560 may be more blurredly displayed than the other circles 510, 520 and 530, or may be displayed in a state where relevant details are omitted. For example, only some of schedule information, weather information, and financial information may be briefly displayed.

The controller 180 can control the display unit 351 to display some of the plurality of circles, based on the angle by which the wheel 400 is turned by the external force of turning the wheel 400 and the direction in which the wheel 400 is turned. Moreover, the controller 180 can set a method of displaying the some circles and a method of displaying an object corresponding to an event which is displayed on each of the some circles, based on the angle by which the wheel 400 is turned by the external force of turning the wheel 400 and the direction in which the wheel 400 is turned.

In a detailed embodiment, the controller 180 can control the display unit 351 to display a circle corresponding to a predetermined application and to display an icon, corresponding to an event which occurs in association with the application, on the circle with respect to an indicator indicating a time when the event occurs, based on the angle by which the wheel 400 is turned by the external force of turning the wheel 400 and the direction in which the wheel 400 is turned. While the plurality of circles 510, 520, 530, 540, 550 and 560 described above with reference to FIG. 5A are being displayed, the user can clockwise or counterclockwise turn the wheel 400 at a certain angle as described above with reference to FIG. 3.

Therefore, as illustrated in FIG. 5B, only some of the displayed plurality of circles 510, 520, 530, 540, 550 and 560 may be displayed. In an embodiment, the first to third circles 510, 520 and 530 may disappear, and the fourth to sixth circles 540, 550 and 560 may be displayed in a method different from the method illustrated in FIG. 5A. In this instance, the first to third circles 510, 520 and 530 may simultaneously or sequentially disappear in various methods along with a natural image change effect. In a detailed embodiment, the first to third circles 510, 520 and 530 may progressively increase in size and may be blurred simultaneously or sequentially, and may disappear as if being pushed outward from a screen of the display unit 351.

Moreover, the fourth to sixth circles 540, 550 and 560 may simultaneously or sequentially disappear in various methods along with the natural image change effect. In a detailed embodiment, the fourth circle 540 may progressively increase in size, may be sharpened, and then may be displayed, and the fifth circle 550 and the sixth circle 560 may progressively increase in size. Such an image change effect may be simultaneously or sequentially obtained.

As described above, as a size of a circle increases, the circle and an object corresponding to an event displayed on the circle may be displayed in various methods. In more detail, the fourth circle 540 may be displayed larger and sharper than FIG. 5A, and regions where a schedule is displayed may be displayed in different colors. In an embodiment, when a lunch date is from 12:00 to 13:00 and the hospital is reserved from 3:00 to 14:00, a region 542 corresponding to a time from 12:00 to 13:00 and a region 544 corresponding to a time from 13:00 to 14:00 can be displayed in different colors. In this instance, the details of a schedule may be displayed as text, and may be displayed as an icon. For example, when the hospital is reserved, a cross-shaped icon indicating the hospital may be displayed.

Moreover, as a size of a circle increases, a displayable region increases. Therefore, pieces of detailed information may be further added and displayed than FIG. 5A. In an embodiment, a place at which a lunch date is appointed or a medical department of a reserved hospital may be displayed together. While the plurality of circles 540, 550 and 560 described above with reference to FIG. 5B are being displayed, the user can clockwise or counterclockwise turn the wheel 400 at a certain angle once again as described above with reference to FIG. 3.

Therefore, as illustrated in FIG. 5C, only some of the displayed plurality of circles 510, 520, 530, 540, 550 and 560 may be displayed. In an embodiment, the fourth circle 540 may disappear, and the fifth and sixth circles 550 and 560 may be displayed in different methods. In this instance, the fourth circle 540 may disappear in various methods along with the natural image change effect. In a detailed embodiment, the fourth circle 540 may progressively increase in size and may be blurred, and may disappear as if being pushed outward from the screen of the display unit 351.

Moreover, the fifth and sixth circles 550 and 560 may be simultaneously or sequentially displayed in various methods along with the natural image change effect. In a detailed embodiment, the fifth and sixth circles 550 and 560 may progressively increase in size, may be sharpened, and then may be displayed simultaneously or sequentially. As described above, as a size of a circle increases, the circle and an object corresponding to an event displayed on the circle may be displayed in various methods. In more detail, the fifth and sixth circles 550 and 560 may be displayed larger and sharper than FIG. 5B.

In an embodiment, when rain is forecast at 14:00, an icon indicating a rain forecast may be displayed on a region 552 on the fifth circle 550 corresponding to 14:00. Also, a detailed time may be displayed on a region adjacent to the icon. Moreover, pieces of detailed information may be additionally displayed than FIG. 5B. Therefore, as if subtitles flow, text (pieces of financial information) displayed on the sixth circle 560 may disappear clockwise or counterclockwise, and new text may be displayed.

Switching between display states of FIGS. 5A to 5C may be made based on a degree to which the wheel 400 is turned and a direction in which the wheel 400 is turned. For example, when the wheel 400 is turned clockwise in a display state of FIG. 5A, the display state may be switched to a display state of FIG. 5B. In addition, when the wheel 400 is turned counterclockwise in the display state of FIG. 5B, the display state may be again switched to the display state of FIG. 5A.

Likewise, when the wheel 400 is turned clockwise in the display state of FIG. 5B, the display state may be switched to a display state of FIG. 5C. In addition, when the wheel 400 is turned counterclockwise in the display state of FIG. 5C, the display state may be again switched to the display state of FIG. 5B. In this instance, when the wheel 400 is turned more counterclockwise than the above-described case, a display state may be immediately switched to the display state of FIG. 5A. In another embodiment, a display state may be switched to the display state of FIG. 5B for a certain time, and then may be switched to the display stat of FIG. 5A. Details of a specific event may be displayed according to a touch input or manipulation of the wheel 400 in the display states of FIGS. 5A to 5C.

Figure 6:
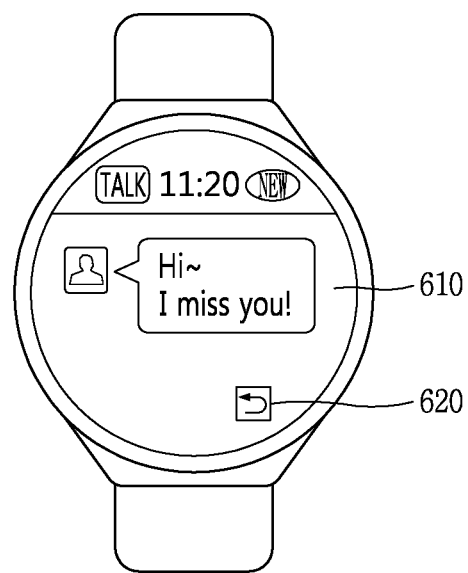
FIG. 6 is a conceptual diagram illustrating an embodiment where details of a specific event are displayed.

FIG. 6 is a conceptual diagram illustrating an embodiment where details of a specific event are displayed. In more detail, when a touch input is applied to an icon displayed on a region 522 on the second circle 520 in FIG. 5A, an execution screen 610 of a messenger application showing a received message may be displayed as illustrated in FIG. 6. In this instance, the touch input may be made by turning the wheel 400 with fingers and then detaching the fingers from the wheel 400, or may be made in a state where the fingers turning the wheel 400 is not detached from the wheel 400.

In another embodiment, when an input that turns the wheel 400 clockwise or counterclockwise is applied to the watch type terminal in a display state illustrated in FIG. 6, details of a next event or a previous event may be displayed. In more detail, while the execution screen 610 of the messenger application showing a message which is received at 11:20 a.m. is being displayed as illustrated in FIG. 6, an input that clockwise turns the wheel 400 may be applied to the watch type terminal. Therefore, a screen may be changed to an execution screen of a messenger application showing a message which is received at 11:28 a.m. after 11:20 a.m.

Likewise, while the execution screen 610 of the messenger application showing a message which is received at 11:20 a.m. is being displayed as illustrated in FIG. 6, an input that counterclockwise turns the wheel 400 may be applied to the watch type terminal. Therefore, a screen may be changed to an execution screen of a messenger application showing a message (see FIG. 5A) which is received at 11:08 a.m. before 11:20 a.m.

When a touch input is applied to a return icon 620 In the display state illustrated in FIG. 6, a display state may return to the display state of FIG. 5A. In another embodiment, a display state may return to the display state of FIG. 5A by applying an input, which is made by pressing the wheel 400, to the watch type terminal or turning a wheel, which is used to return to a previous state, among a plurality of wheels.

In another embodiment, a predetermined application may be immediately executed according to a motion of turning the wheel 400. In more detail, when the wheel 400 is clockwise or counterclockwise turned with three fingers, an execution screen of a specific application may be immediately displayed. In this instance, while the wheel 400 is being turned with the three fingers, a calibration may be displayed on an outer side of a screen of the display unit 351.

The controller 180 can set at least one of a method of arranging icons of a plurality of applications, sizes of the icons, and the number of icons which are displayed, based on an angle by which the wheel 400 is turned by an external force of turning the wheel 400 and a direction in which the wheel 400 is turned.

Figure 7A:
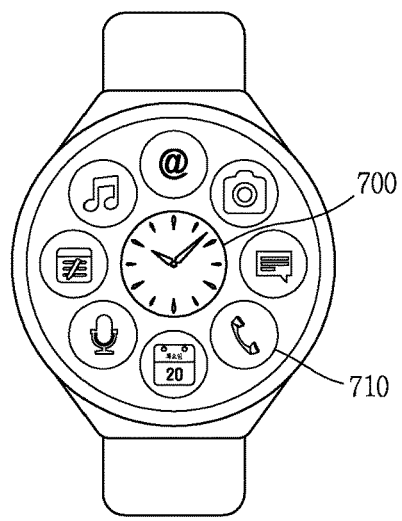
FIGS. 7A, 7B and 7C are conceptual diagrams illustrating an embodiment where an icon of an application is displayed.
Figure 7B:
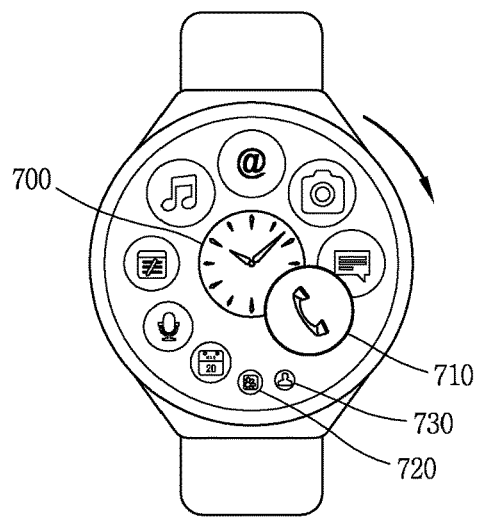
Figure 7C:
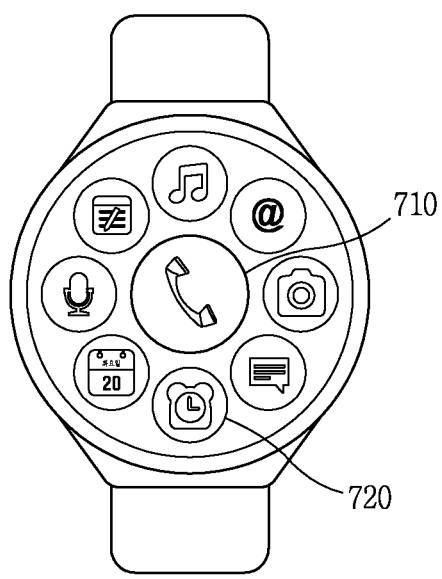

FIGS. 7A, 7B and 7C are conceptual diagrams illustrating an embodiment where an icon of an application is displayed. While icons of a plurality of applications are being displayed as illustrated in FIG. 7A, a user can clockwise or counterclockwise turn the wheel 400 at a certain angle as described above with reference to FIG. 3. As the wheel 400 is clockwise turned, the icons of the plurality of applications may be moved as if being spirally drawn into the inside as illustrated in FIG. 7B.

Referring to FIG. 7B, as the wheel 400 is clockwise turned, a first icon 710 may increase in size and may be moved to a center of a screen of the display unit 351 as if being spirally drawn into the inside. Moreover, in FIG. 7A, a plurality of icons which surround an icon 700 arranged at the center of the screen of the display unit 351 may be adjusted in size and position along with the first icon 710. In more detail, the other icons may be clockwise moved by a distance, by which the first icon 710 is moved, as if being drawn into the inside in a spiral shape.

In this instance, some icons which are arranged at an end of the spiral shape may be reduced in size. Also, in addition to the icon which is displayed as illustrated in FIG. 7A, additional icons 720 and 730 may be displayed in a small size. In addition, when a user turns the wheel 400 with fingers and then detaches the fingers from the wheel 400, the icons of the plurality of applications may be rearranged in a state illustrated in FIG. 7C.

Referring to FIG. 7C, instead of the icon which is displayed on the center of the screen of the display unit 351 as illustrated in FIG. 7A, the first icon 710 may be displayed on the center of the screen of the display unit 351. Also, the icon 720 which is newly displayed may be arranged in a region surrounding the first icon 710.

The user can set a method of arranging the icons of the plurality of applications, sizes of the icons, the number of displayed icons, and/or the like. In an embodiment, when the user inputs an input which clockwise draws a portion of a circle on the screen of the display unit 351, icons of a plurality of applications may be arranged in an order from a latest-installed icon to a first-installed icon. Further, when the user inputs an input which counterclockwise draws a portion of a circle on the screen of the display unit 351, icons of a plurality of applications may be arranged in an order from a first-installed icon to a last-installed icon.

Figure 8A:
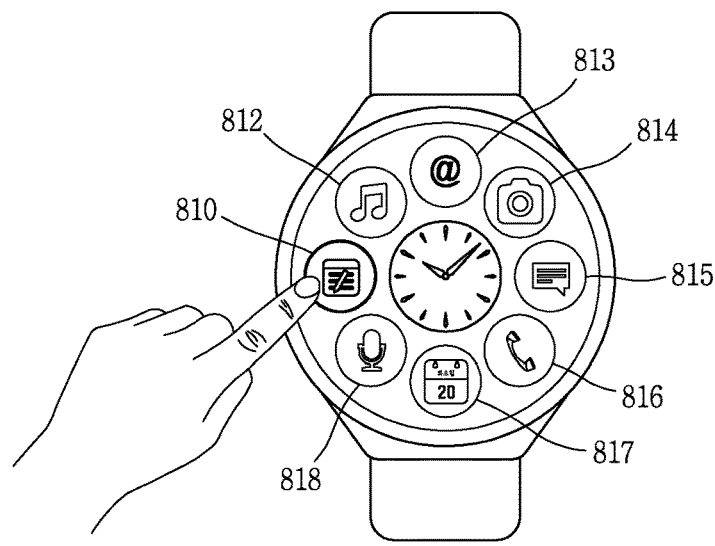
FIGS. 8A to 8D are conceptual diagrams illustrating an embodiment of setting a method of displaying an icon of an application.
Figure 8B:
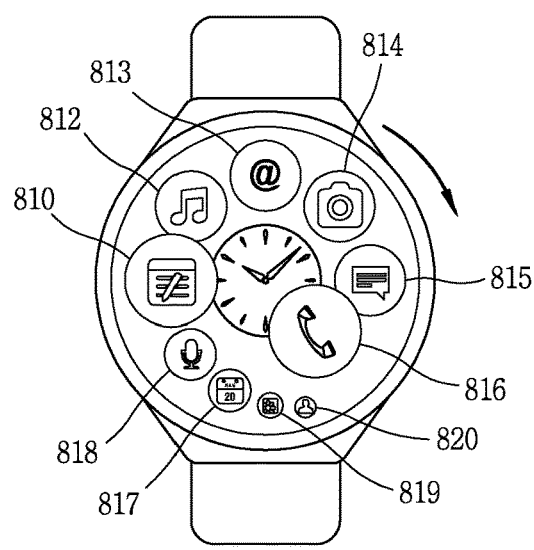

FIGS. 8A to 8D are conceptual diagrams illustrating an embodiment of setting a method of displaying an icon of an application. Referring to FIG. 8A, while icons of a plurality of applications are being displayed, a user can select a first icon 810 by applying a long touch input to the first icon 810. In addition, referring to FIG. 8B, the user can clockwise turn the wheel 400 as described above with reference to FIG. 3. As the wheel 400 is clockwise turned, icons 812 to 818 of a plurality of applications may be clockwise moved as if being drawn into the inside in a spiral shape. In this instance, a position of the selected first icon 810 may be fixed.

In more detail, a size of the icon 816 which is moved to a center of a screen of the display unit 351 may increase, and some icons 817 and 818 which are arranged at an end of the spiral shape may be reduced in size. Also, additional icons 819 and 820 may be newly displayed on the end of the spiral shape. In this instance, it can be seen that the selected icon 810 may be fixedly displayed at an initial position in a state where a size has increased.

Figure 8C:
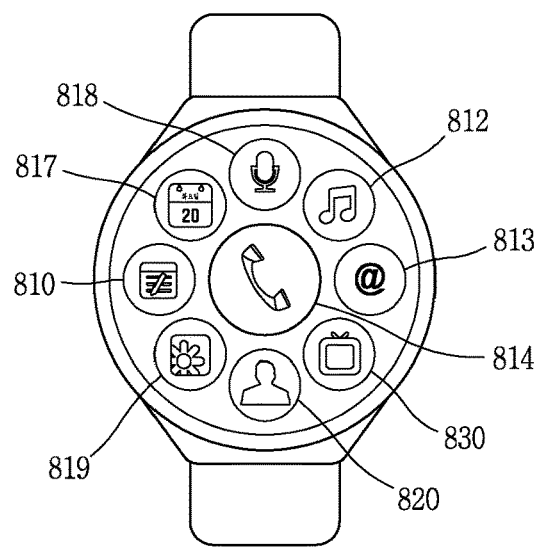

In another embodiment, while the user is turning the wheel 400, the long touch input applied to the first icon 810 may be continuously maintained. In addition, when the user stops a motion of turning the wheel 400 with fingers and then detaching the fingers from the wheel 400, a plurality of icons may be rearranged as illustrated in FIG. 8C. In comparison with FIG. 8A, it can be seen that the some icons 817 and 818 disappear and new icons 819, 820 and 830 are displayed. Also, it can be seen that an order where the icons are arranged is changed.

In another embodiment, the user can rearrange positions of the icons by applying a touch input to the screen of the display unit 351. In more detail, the first icon 810 may be rearranged at a desired position by applying a drag input to the screen of the display unit 351. Alternatively, by applying a drag input to a position at which a second icon (an icon different from the first icon 810) is being displayed, the first icon 810 may be displayed at the position at which the second icon is being displayed. Therefore, the second icon may be moved to a position at which the first icon 810 is initially displayed, or may be moved to a position which is pushed by the movement of the first icon 810.

Some of icons of a plurality of applications may be selected and displayed. In an embodiment, in a display state illustrated in FIG. 8B, the user can apply a drag input to the first icon 810 in a state of turning the wheel 400 with the fingers and then detaching the fingers from the wheel 400 or maintaining the fingers. For example, the user can apply a drag input to a third icon 819 which is newly displayed.

Figure 8D:
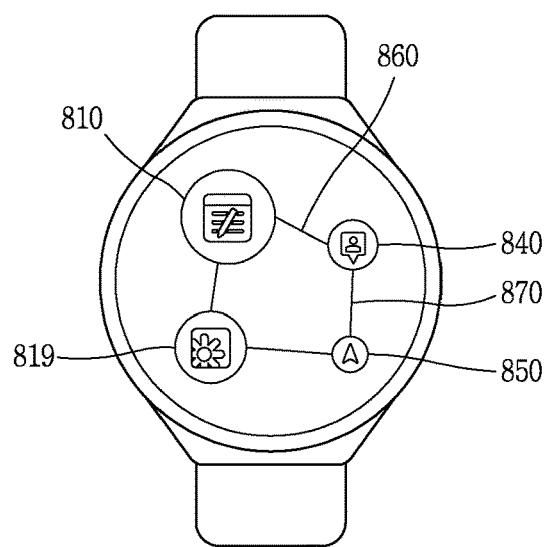

Therefore, referring to FIG. 8D, the first icon 810 and the third icon 819 may be simultaneously displayed. Also, a fourth icon 840 and a fifth icon 850 which have been selected by the same method may be simultaneously displayed. In more detail, the icons 810, 819, 840 and 850 may be connected by a line. In this state, the user can release a connection state by applying a flicking input to the connected line.

For example, the user can apply the flicking input to a line 860 that connects the first icon 810 to the fourth icon 840, and apply the flicking input to a line 870 that connects the fourth icon 840 to the fifth icon 850. Therefore, the lines 860 and 870 may be deleted, and the disconnected fourth icon 840 may disappear. In another embodiment, the icons 810, 819, 840 and 850 may be displayed in different sizes, based on the frequency number of execution. In more detail, the first icon 810 corresponding to an application which is frequently executed may be displayed in a large size, and the fifth icon 850 corresponding to an application which is sometimes executed may be displayed in a small size.

Figure 9A:
FIGS. 9A to 9D are conceptual diagrams illustrating another embodiment of displaying an icon of an application.

Next, FIGS. 9A to 9D are conceptual diagrams illustrating another embodiment of displaying an icon of an application. Referring to FIG. 9A, a plurality of icons may be arranged to form a circle which surrounds an icon arranged at a center. Also, a page icon 910 that indicates arrangement stages of the icons may be displayed on a certain region of a screen of the display unit 351.

Figure 9B:

In addition, referring to FIG. 9B, the wheel 400 may be clockwise turned, and simultaneously, a plurality of icons may be added to form a circle from an outer side of the screen of the display unit 351. In more detail, as the wheel 400 is turned clockwise, the plurality of icons may be collected to form a circle inward into the screen of the display unit 351.

Figure 9C:

Referring to FIG. 9C, when the wheel 400 is turned by a certain angle, the plurality of icons may be added to form a larger circle. In this instance, a second arrangement stage may be marked on the page icon 910. Embodiments relevant to FIGS. 9A to 9C will now be described in more detail. In an embodiment, as a stage becomes higher, icons which are displayed on an inward side may be briefly displayed. In more detail, the icons may be displayed in a simpler shape or sign. In another embodiment, icons of a newly installed application may be displayed on the outermost side.

In another embodiment, when the wheel 400 is counterclockwise turned or a touch input is applied to the display unit 351 in a display state illustrated in FIG. 9C, a display state may return to a display state of FIG. 9A through a display state of FIG. 9B. In another embodiment, the number of displayed icons of an application may be previously set or may be set by a user, and a method where the displayed icons are arranged may be previously set variously or may be set by the user.

Figure 9D:
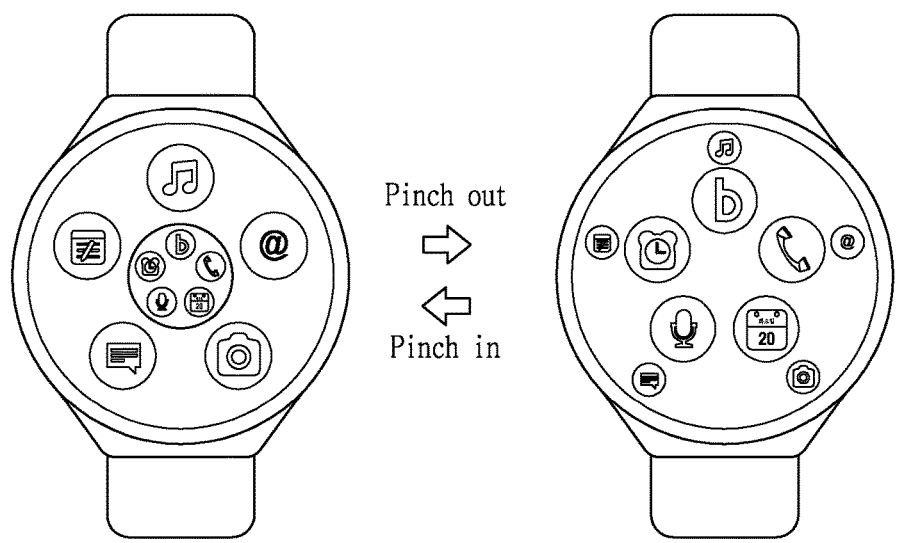

Referring to FIG. 9D, icons of an application may be arranged to form an inner circle and an outer circle. In more detail, icons which are arranged to form the inner circle may be displayed in a relatively smaller size, and icons which are arranged to form the outer circle may be displayed in a relatively larger size. In this state, when a pinch-out input is applied to the screen of the display unit 351, the icons which are arranged to form the inner circle may increase in size, and icons which are arranged to form the outer circle may be reduced in size.

Further, when a pinch-in input is applied to the screen of the display unit 351, the icons which are arranged to form the inner circle may be reduced in size, and icons which are arranged to form the outer circle may be reduced in size and may return to an initial state. While a plurality of objects which are generated during a predetermined first period are being displayed, the controller 180 can control the display unit 351 to display only objects, which are generated during a second period included in the first period, among the generated plurality of objects, based on an angle by which the wheel 400 is turned by an external force of turning the wheel 400 and a direction in which the wheel 400 is turned.

Figure 10A:
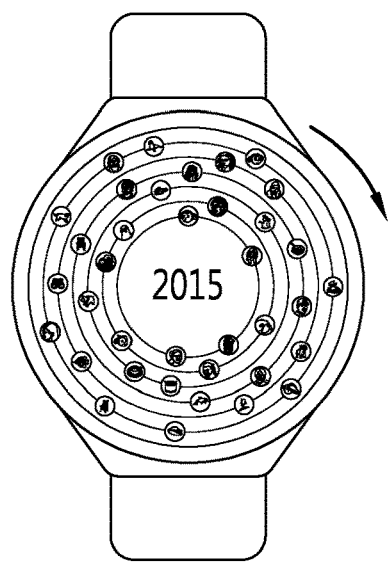
FIGS. 10A to 10D are conceptual diagrams illustrating an embodiment of displaying a plurality of generated objects during a predetermined period.

FIGS. 10A to 10D are conceptual diagrams illustrating an embodiment of displaying a plurality of generated objects during a predetermined period. Referring to FIG. 10A, a plurality of thumbnail images which have been captured in the year 2015 may be arranged on a whole screen of the display unit 351. Also, a corresponding year may be displayed on a center of the screen of the display unit 351. In this instance, a year which is first displayed may be a year corresponding to a current date, and as a flicking input which is made in an up and down direction or a left and right direction is applied to the screen of the display unit 351, a plurality of thumbnail images which have been captured in another year may be displayed.

Figure 10B:

In addition, when a user clockwise turns the wheel 400, as illustrated in FIG. 10B, a plurality of thumbnail images which have been captured in a specific month in the year 2015 may be arranged on the whole screen of the display unit 351. Also, a corresponding month may be displayed on the center of the screen of the display unit 351. In this instance, a month which is first displayed may be a month corresponding to a current date, and as the flicking input which is made in an up and down direction or a left and right direction is applied to the screen of the display unit 351, a plurality of thumbnail images which have been captured in another month may be displayed.

Figure 10C:

In addition, when the user clockwise turns the wheel 400 again, as illustrated in FIG. 10C, a plurality of thumbnail images which have been captured on a specific date in the year 2015 may be arranged on the whole screen of the display unit 351. Also, a corresponding date may be displayed on the center of the screen of the display unit 351. In this instance, a date which is first displayed may be a current date, and as the flicking input which is made in an up and down direction or a left and right direction is applied to the screen of the display unit 351, a plurality of thumbnail images which have been captured on another date may be displayed.

Figure 10D:

In addition, when the user clockwise turns the wheel 400 again, as illustrated in FIG. 10D, one image may be displayed. In this instance, the displayed image may be an image which has been latest captured today, and as the flicking input which is made in an up and down direction or a left and right direction is applied to the screen of the display unit 351, a plurality of thumbnail images which have been captured at another time today may be displayed. The controller 180 can set a user input value associated with a predetermined application, based on an angle by which the wheel 400 is turned by an external force of turning the wheel 400 and a direction in which the wheel 400 is turned.

Figure 11A:
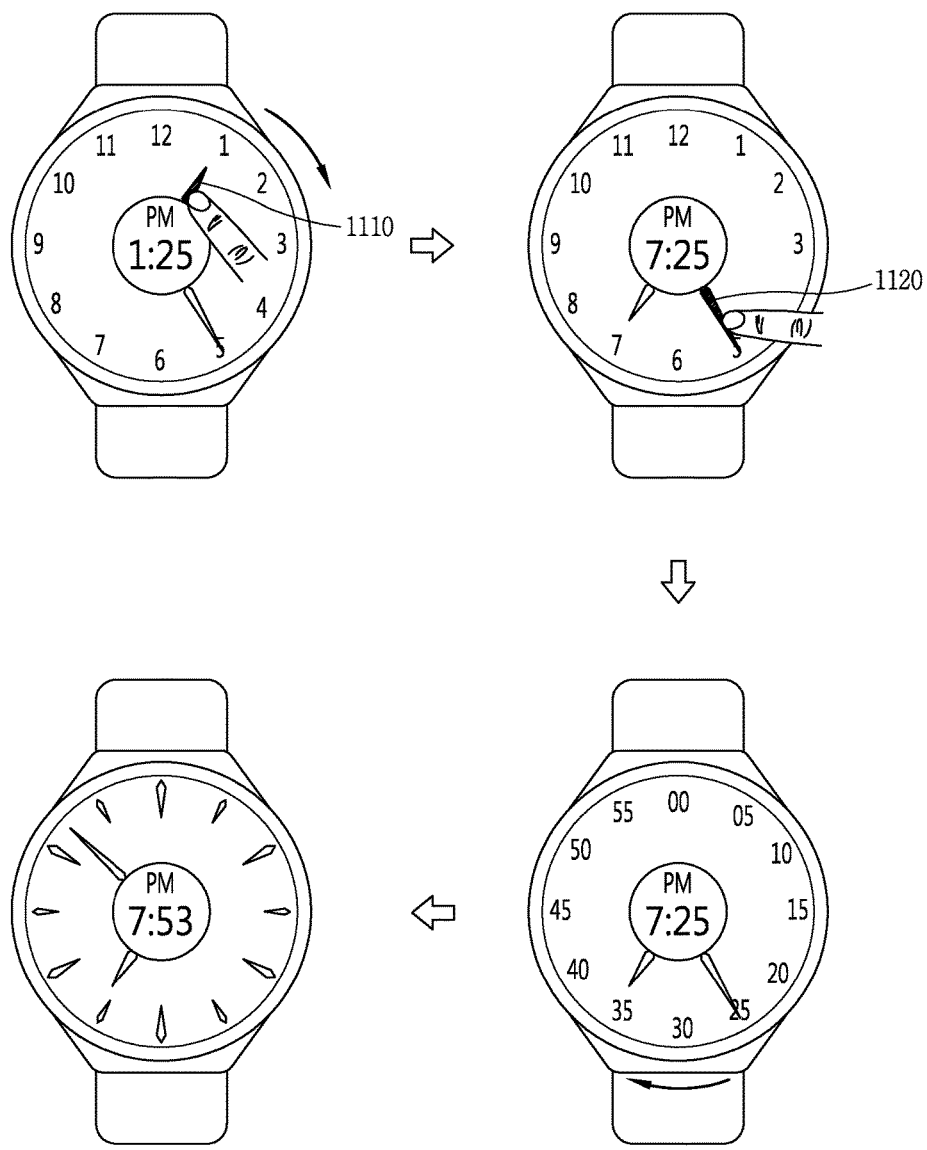
FIGS. 11A to 11E are conceptual diagrams illustrating an embodiment of setting a user input value.
Figure 11B:
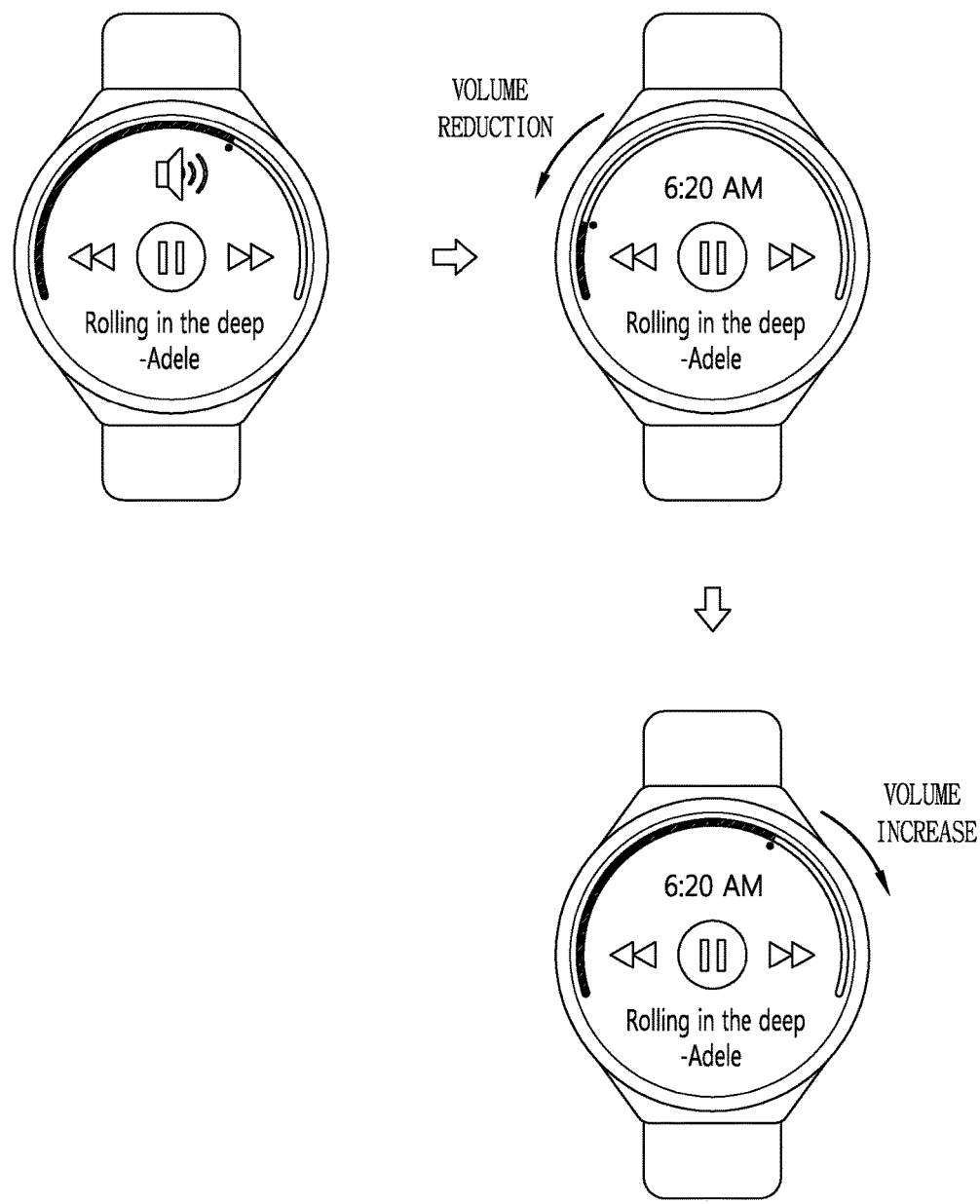
Figure 11C:
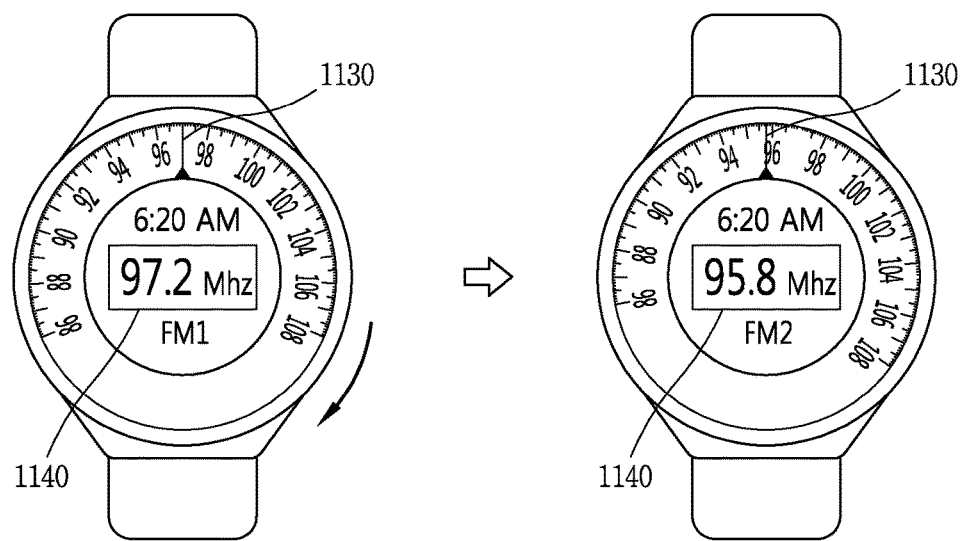
Figure 11D:
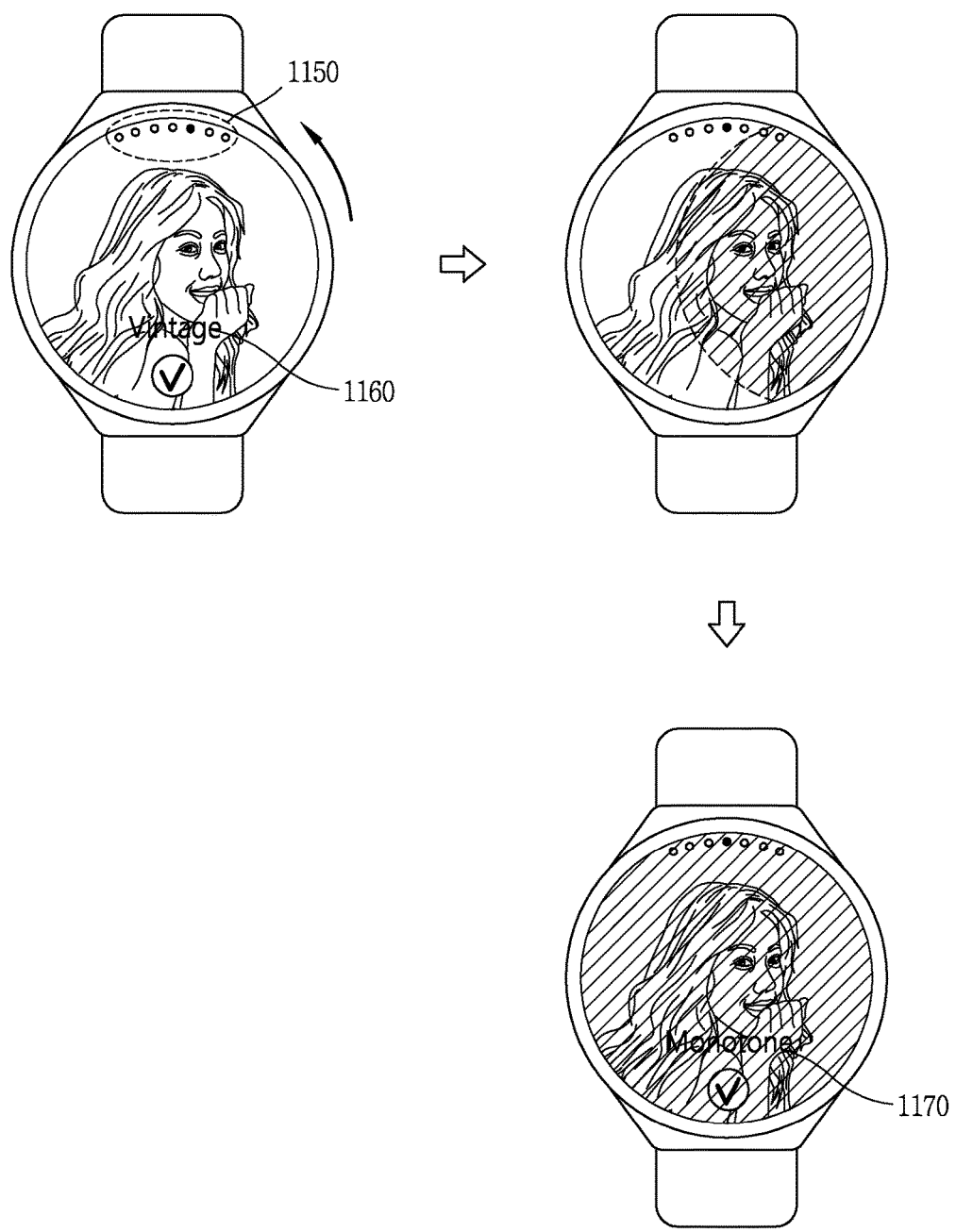

Next, FIGS. 11A to 11E are conceptual diagrams illustrating an embodiment of setting a user input value. Referring to FIG. 11A, a touch input is applied to an hour hand 1110 while a current time (01:25 p.m.) is being displayed. In addition, a user can clockwise or counterclockwise turn the wheel 400 to set an alarm time. In an embodiment, when the user clockwise turns the wheel 400, the hour hand 1110 may also be turned clockwise. Therefore, when the hour hand 1110 faces 07:00, the alarm time may be set to 07:00.

In addition, when the touch input is applied to a minute hand 1120, a number which is displayed on an outer side and indicates a time may be changed in units of a minute. Likewise, the user can clockwise or counterclockwise turn the wheel 400 to set the alarm time. In an embodiment, when the user clockwise turns the wheel 400, the minute hand 1120 may also be turned clockwise. Therefore, when the minute hand 1120 faces fifty-three minutes, the alarm time may be set to 07:53.

In this way, when the setting of the alarm time is completed, a message, a notification sound, a vibration, and/or the like indicating the completion of the setting can be output. In another embodiment, referring to FIG. 11B, when the wheel 400 is counterclockwise turned while an execution screen of a music reproduction application is being displayed, a volume of music which is being reproduced can be reduced. Further, when the wheel 400 is clockwise turned, a volume of the music which is being reproduced can increase.

Moreover, a level of volume can be adjusted based on a degree (an angle) to which the wheel 400 is turned. In more detail, as the wheel 400 is more turned counterclockwise, a volume of music is reduced more. Likewise, as the wheel 400 is more turned clockwise, a volume of the music is increased more. In another embodiment, referring to FIG. 11C, while an execution screen (a frequency setting screen) of a radio reproduction application is being displayed, as the wheel 400 is clockwise or counterclockwise turned, a frequency of a radio may be set.

In an embodiment, a calibration 1130 indicating a frequency may be fixed, and a numerical pad indicating a frequency may be clockwise turned to a degree to which the wheel 400 is clockwise turned. Also, a frequency corresponding to a degree to which the wheel 400 is turned may be displayed on a center 1140. In an embodiment, referring to FIG. 11D, while an execution screen of an image editing application is being displayed, an image editing effect to be applied may be selected by clockwise or counterclockwise turning the wheel 400.

In an embodiment, a plurality of mark icons 1150 indicating a direction in which the wheel 400 is turned and an order corresponding to a corresponding image effect (a first image effect) may be displayed on a certain region of a screen of the display unit 351. In more detail, a mark icon of the order corresponding to the first image effect may be largely displayed. Also, details 1160 of the first image effect may be displayed.

In addition, when the wheel 400 is counterclockwise turned, a mark icon of an order corresponding to a corresponding image effect (a second image effect) may be largely displayed to a degree to which the wheel 400 is turned. Also, the second image effect may be naturally applied to an image as if a filter lens screen is added to the screen of the display unit 351. In this instance, details 1170 of the second image effect may be displayed.

Figure 11E:
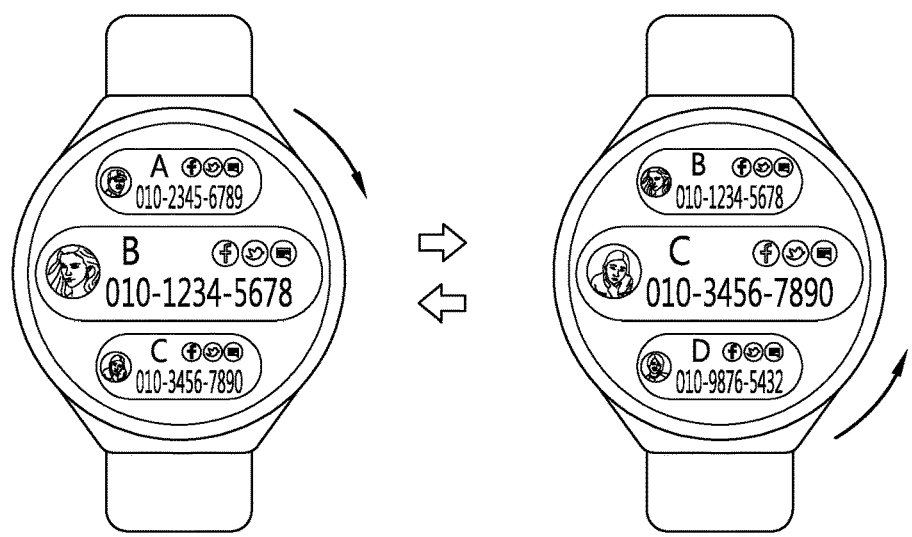

In another embodiment, referring to FIG. 11E, when the wheel 400 is clockwise turned while a contact list is being displayed on the screen of the display unit 351, a new contact list may be displayed on a lower side like a scroll input being applied to under the screen of the display unit 351. Further, when the wheel 400 is counterclockwise turned, a new contact list may be displayed on an upper side like the scroll input being applied to on the screen of the display unit 351.

The controller 180 can control the display unit 351 to display an information value, which is changed with time, with respect to an indicator indicating a time, based on an angle by which the wheel 400 is turned by an external force of turning the wheel 400 and a direction in which the wheel 400 is turned.

Figure 12:
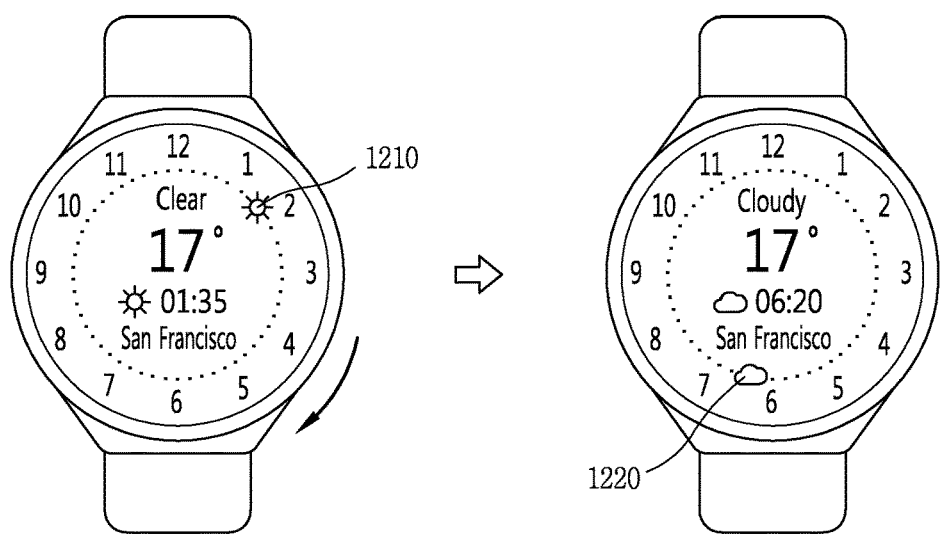
FIG. 12 is a conceptual diagram illustrating an embodiment of displaying an information value which is changed with time.

FIG. 12 is a conceptual diagram illustrating an embodiment of displaying an information value which is changed with time. Referring to FIG. 12, a current time and an icon indicating weather may be displayed on a region corresponding to the current time. In addition, when a user turns the wheel 400 using their fingers and then detaches their fingers from the wheel 400, a corresponding time and weather information corresponding to the time can be displayed on a region to which the wheel 400 is moved.

In an embodiment, when a current time is 01:35 and weather is clear, a sunlight-shaped icon 1210 may be displayed on a region corresponding to 01:35. Also, a weather condition, a temperature, a current time, a currently positioned district, and/or the like may be displayed on a middle region of a screen of the display unit 351. Furthermore, a clear-weather image may be displayed as a background on the whole screen of the display unit 351.

In addition, when the user clockwise turns the wheel 400 with their fingers and then detaches their fingers from the wheel 400, weather information corresponding to 06:20 that is a time corresponding to a region to which the wheel 400 is moved the time may be displayed. In more detail, a cloud-shaped icon 1220 may be displayed on a region corresponding to 06:20. Likewise, a weather condition, a temperature, a current time, a currently positioned district, and/or the like may be displayed on the middle region of the screen of the display unit 351. Furthermore, a cloudy-weather image may be displayed as a background on the whole screen of the display unit 351.

The controller 180 can control the display unit 351 to enlarge and display visual information which is being displayed on a certain region of the display unit 351, based on a user input that selects the certain region, an angle by which the wheel 400 is turned by an external force of turning the wheel 400, and a direction in which the wheel 400 is turned.

Figure 13A:
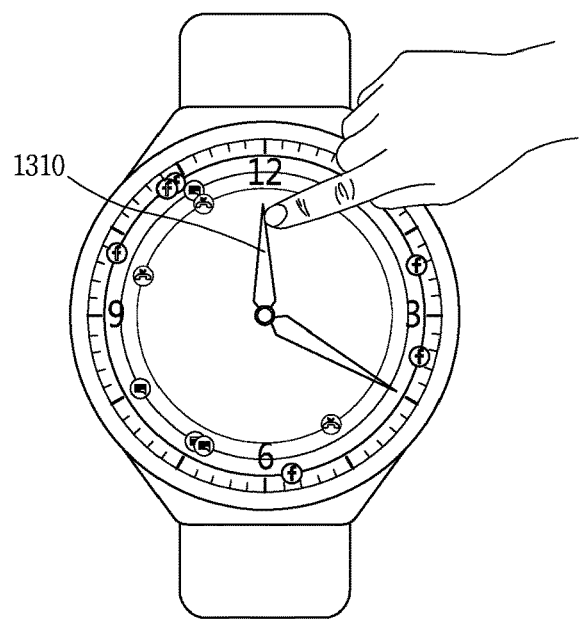
FIGS. 13A to 13D are conceptual diagrams illustrating an embodiment of enlarging and displaying a region.
Figure 13B:
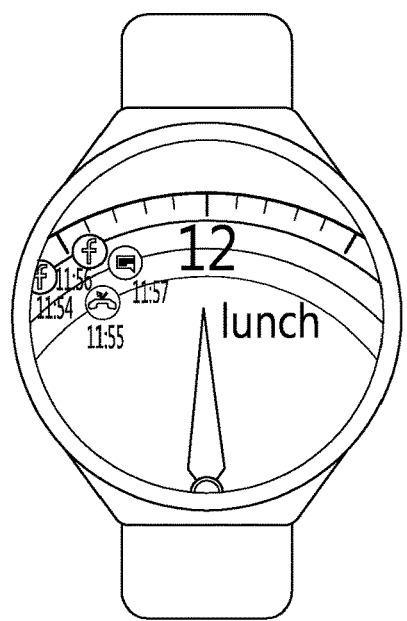

FIGS. 13A to 13D are conceptual diagrams illustrating an embodiment of enlarging and displaying a region. Referring to FIG. 13A, as described above with reference to FIG. 5A, a plurality of icons corresponding to an event and a hour hand and a minute hand which indicate a current time may be displayed. In addition, referring to FIG. 13B, when a touch input is applied to a region 1310 adjacent to a portion on which a number "12" is being displayed and an input which is made by turning the wheel 400 is applied to the display unit 351 simultaneously or sequentially, the region 1310 may be enlarged and displayed.

In another embodiment, when an input which is made by turning the wheel 400 is applied to the display unit 351 without a touch input, the region 1310 corresponding to a current time may be enlarged and displayed. As a certain region is enlarged, pieces of information which are displayed on the certain region may be display in a larger size, and pieces of information relevant thereto may be additionally displayed. In more detail, a plurality of corresponding to an event may be displayed in a larger size. Also, a time when the event occurs, a schedule corresponding to a current time, and/or the like may be additionally displayed.

Figure 13C:
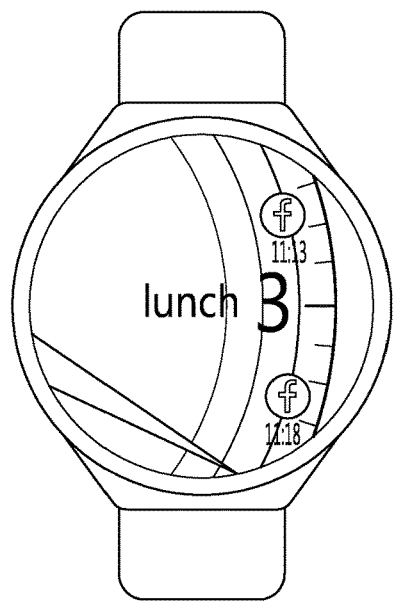

In addition, referring to FIG. 13C, the user can clockwise turn the wheel 400. Therefore, a time domain corresponding to a degree to which the wheel 400 is turned may be enlarged and displayed. For example, a portion on which a number "3" is being displayed may be enlarged, and a plurality of icons corresponding to an event at a corresponding time may be displayed in a larger size. Also, a time when the event occurs, a schedule at the corresponding time, and/or the like may be additionally displayed.

Figure 13D:
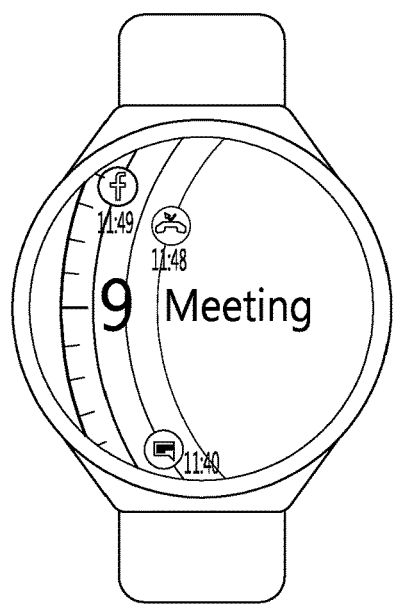

In another embodiment, referring to FIG. 13D, the user can counterclockwise turn the wheel 400. Therefore, a time domain corresponding to a degree to which the wheel 400 is turned may be enlarged and displayed. For example, a portion on which a number "9" is being displayed may be enlarged, and a plurality of icons corresponding to an event at a corresponding time may be displayed in a larger size. Also, a time when the event occurs, a schedule at the corresponding time, and/or the like may be additionally displayed.

The controller 180 can control the display unit 351 to display second visual information while first visual information is being displayed, based on an angle by which the wheel 400 is turned by an external force of turning the wheel 400 and a direction in which the wheel 400 is turned. Moreover, the controller 180 can control the display unit 351 to again display the first visual information while the second visual information is being displayed, based on the wheel 400 being turned in a direction opposite to the direction by the external force of turning the wheel 400.

Figure 14A:
FIGS. 14A to 14D are conceptual diagrams illustrating an embodiment of displaying the amount of exercise which is done during a specific period.

FIGS. 14A to 14D are conceptual diagrams illustrating an embodiment of displaying the amount of exercise which is done during a specific period. Referring to FIG. 14A, the amount of exercise which has been done for a day and a circle graph showing the amount of exercise may be displayed. In more detail, calorie which has been burned up by exercise today, the number of steps, and/or the like may be displayed on a middle region 1410 of a screen of the display unit 351. Also, a circle graph corresponding to the kind of exercise may be displayed. For example, a circle graph 1412 corresponding to a degree to which a user has walked today, a circle graph 1414 corresponding to a degree to which the user has run today, and a circle graph 1416 corresponding to a degree to which the user has moved by bicycle today may be displayed on an outer side of the screen of the display unit 351.

Figure 14B:
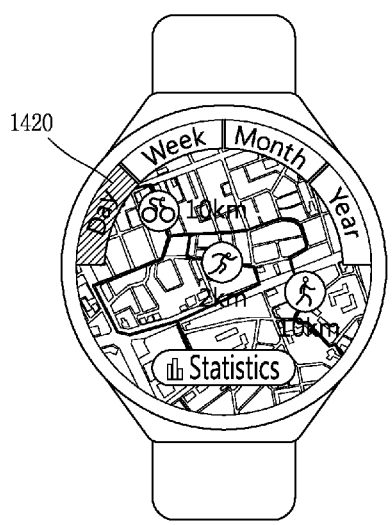

In addition, referring to FIG. 14B, when the user turns the wheel 400 clockwise or counterclockwise or a touch input is applied to a today route view icon, a route where the user has walked for a day, a route where the user has run, a route where the user has moved by bicycle, and/or the like may be marked on a map. In this instance, an icon 1420 indicating a day unit may be displayed in a different color or brightness. Moreover, by clockwise turning the wheel 400, the amount of daily, weekly, monthly, and yearly exercise may be displayed.

Figure 14C:
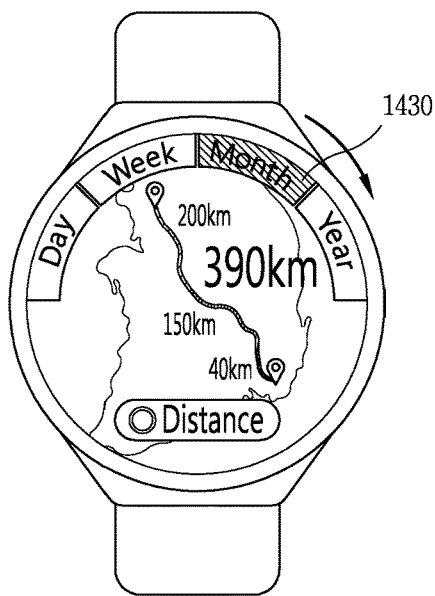

Referring to FIG. 14C, an icon 1420 indicating a month unit may be displayed in a different color or brightness, based on a degree to which the wheel 400 is clockwise turned. Also, a distance by which the user has walked for a month may be marked on the map. In this instance, the distance by which the user has walked for a month may be marked as an actually moved route, and a distance may be calculated and may be marked as a route having the same distance as the calculated distance. For example, the distance by which the user has walked for a month may be marked as a route from Seoul to Busan.

Figure 14D:
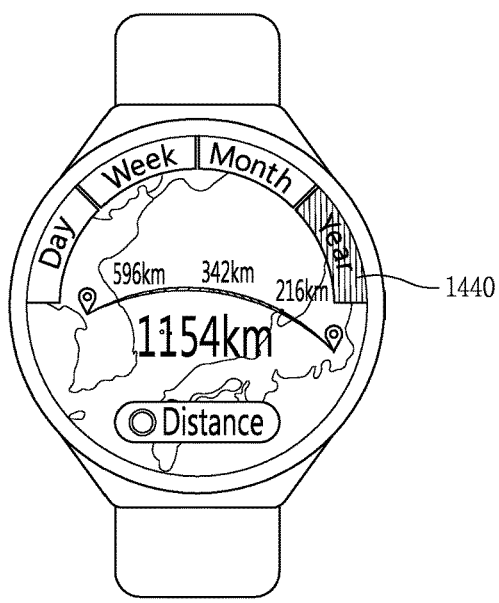

Referring to FIG. 14D, an icon 1440 indicating a year unit may be displayed in a different color or brightness, based on a degree to which the wheel 400 is clockwise turned. Also, a distance by which the user has walked for a year may be marked on the map. In this instance, the distance by which the user has walked for a year may be marked as an actually moved route, and a distance may be calculated and may be marked as a route having the same distance as the calculated distance. For example, the distance by which the user has walked for a year may be displayed on a globe image which is turned from Seoul to Tokyo.

Figure 15A:
FIGS. 15A and 15B are conceptual diagrams illustrating an embodiment of displaying time based on districts.
Figure 15B:
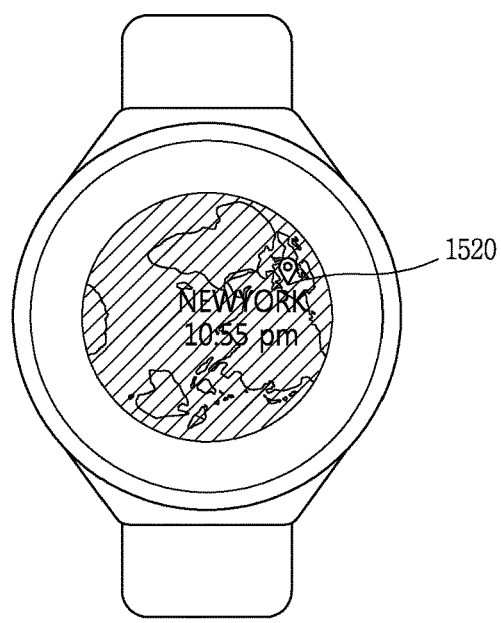

FIGS. 15A and 15B are conceptual diagrams illustrating an embodiment of displaying time based on districts. Referring to FIG. 15A, when an application for showing a global time is executed, a district and a time at which a user is currently positioned may be marked on a certain region of a globe image. In addition, when the user turns the wheel 400 clockwise or counterclockwise, the globe image may be clockwise or counterclockwise turned, and a set district and a time and weather of the set district may be displayed.

Referring to FIG. 15B, when the user clockwise turns the wheel 400, the globe image may also be clockwise turned, and a set district and a time and weather of the set district may be displayed. For example, a position and a current time of New York may be marked on a certain region 1520 of the globe image. In another embodiment, an appropriate image effect may be displayed according to a change in time. In more detail, a brightness change corresponding to a change in day and night, a moon or sun image, and/or the like may be displayed together.

When the user selects a specific time range and clockwise or counterclockwise turns the wheel 400, information corresponding to the selected time range may be enlarged and displayed on a region equal to a degree to which the wheel 400 is turned.

Figure 16A:
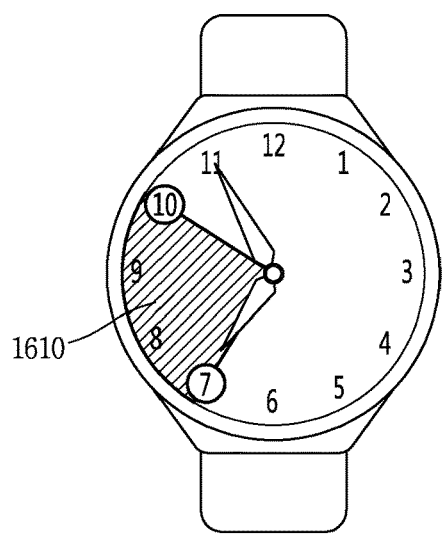
FIGS. 16A and 16B are conceptual diagrams illustrating an embodiment where information corresponding to a specific time is displayed on an enlarged region.
Figure 16B:
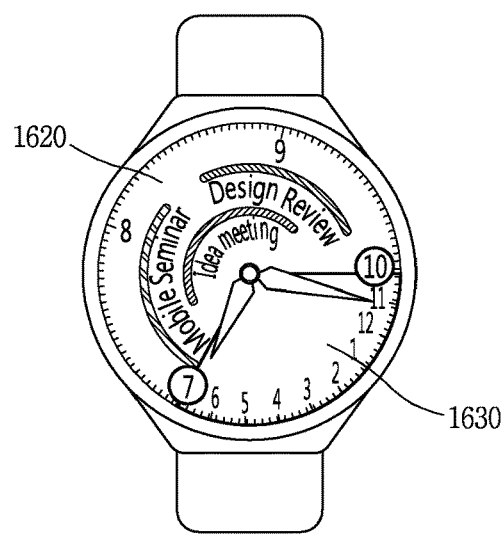

FIGS. 16A and 16B are conceptual diagrams illustrating an embodiment where information corresponding to a specific time is displayed on an enlarged region. Referring to FIG. 16A, when a user selects a time range between 07:00 and 10:00, a region 1610 corresponding to the selected time range may be displayed in a different color or brightness. The region 1610 corresponding to the selected time range may be selected by a touch input or an input which is made by turning the wheel 400.

In an embodiment, the touch input may be sequentially applied to numbers "7" and "10" or the touch input may be applied to the number "7", and then, the region 1610 up to the number "10" may be selected by turning the wheel 400 at a certain angle. In another embodiment, the region 1610 corresponding to a corresponding time range may be selected by applying a long touch input to the number "7" and then applying a drag input to the number "10".

In addition, referring to FIG. 16B, when a time range between 07:00 and 10:00 is selected and then an input which is made by turning the wheel 400 is applied to the display unit 351, information corresponding to the time range between 07:00 and 10:00 may be enlarged and displayed on a region 1620 equal to a degree to which the wheel 400 is turned. Furthermore, a time other than the time range, information other than the time range, and/or the like may be reduced and displayed on another region 1630. As a result, information corresponding to a time range where there are a number of schedules may be enlarged and displayed by enlarging a display area with the wheel 400.

Figure 17A:
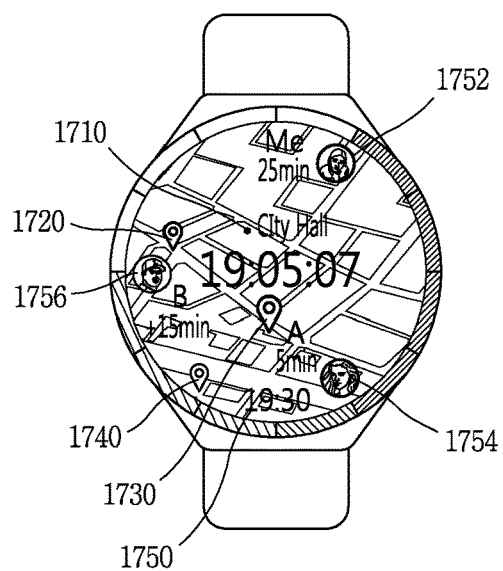
FIGS. 17A and 17B are conceptual diagrams illustrating an embodiment of displaying a position of a promise other party based on a promised time.
Figure 17B:
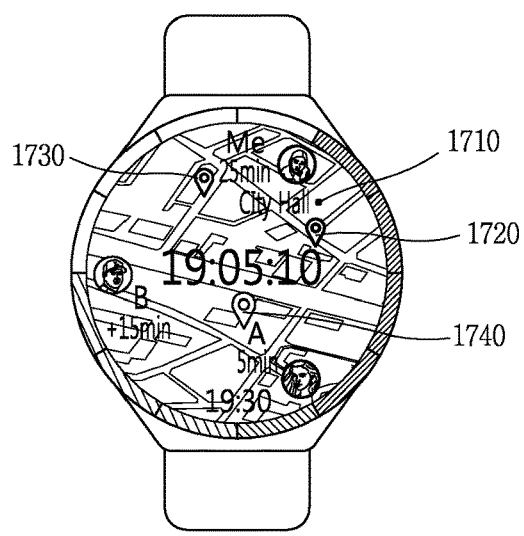

FIGS. 17A and 17B are conceptual diagrams illustrating an embodiment of displaying a position of a promise other party based on a promised time. Referring to FIG. 17A, a current time may be displayed on a middle region of a screen of the display unit 351. Also, a position 1710 of a promised place, a position 1720 of a place at which a person A is positioned, a position 1730 of a place where a user is currently positioned, and a position 1740 of a place at which another person B is currently positioned may be three-dimensionally displayed. In this instance, a three-dimensional (3D) map may be displayed with respect to the position 1730 of the place where the user is currently positioned, and the positions 1710, 1720, 1730 and 1740 may be three-dimensionally displayed based on an actual position at a current time.

Moreover, a promised time may be displayed on a corresponding region 1750. A time taken until arriving at a promised place may be calculated, and an icon of the user, an icon of the person A, and an icon of the other person B may be displayed on a region corresponding to the calculated time. For example, a promised time is 19:30, and when it is expected that 25 minutes are taken until the user arrives at the promised place, the icon corresponding to the user can be displayed on a region 1752 corresponding to 19:05.

Likewise, when it is expected that 5 minutes are taken until the person A arrives at the promised place, the icon corresponding to the person A may be displayed on a region 1754 corresponding to 19:25 Moreover, when it is expected that the other person B arrives at the promised place after 15 minutes elapse, the icon corresponding to the other person B may be displayed on a region 1756 corresponding to 19:45.

In another embodiment, a touch input may be applied to the region 1756 on which the icon corresponding to the other person B is being displayed. Therefore, referring to FIG. 17B, the 3D map which is displayed with respect to the position 1730 of the user can be changed and displayed with respect to the position 1740 of the other person B.

Figure 18A:
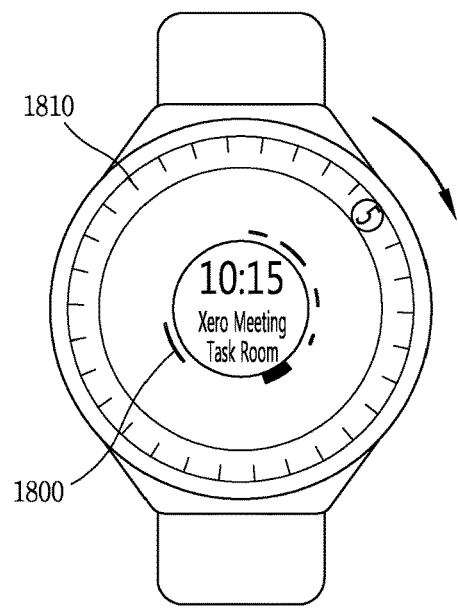
FIGS. 18A, 18B and 18C are conceptual diagrams illustrating an embodiment of displaying a schedule on a specific date when the specific date is selected.
Figure 18B:
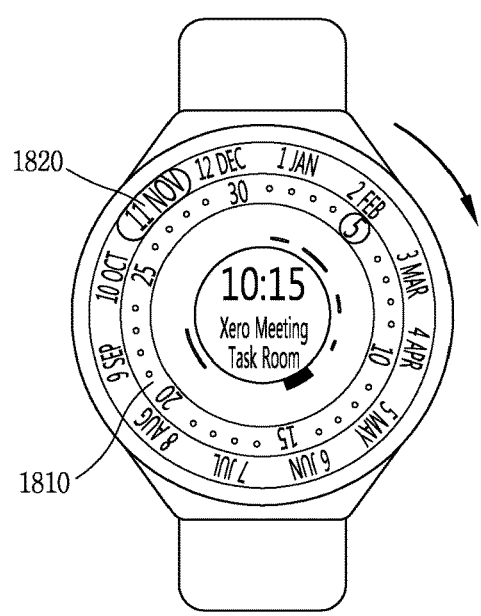
Figure 18C:
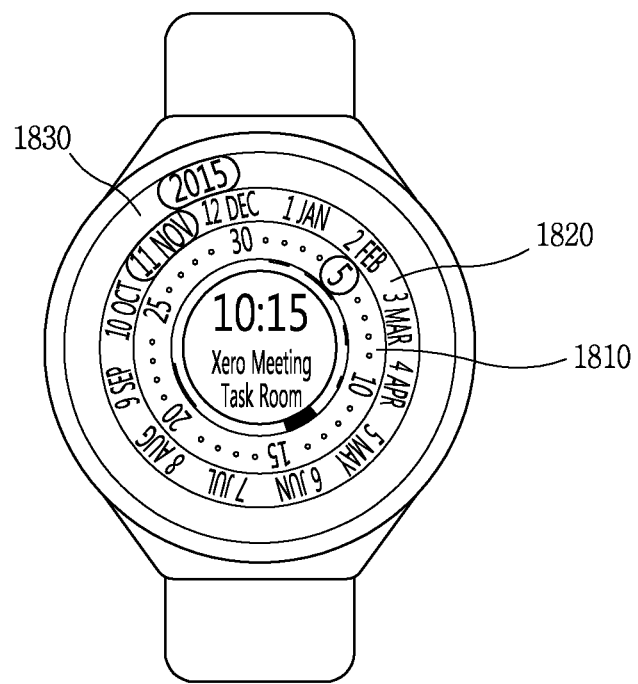

FIGS. 18A, 18B and 18C are conceptual diagrams illustrating an embodiment of displaying a schedule on a specific date when the specific date is selected. Referring to FIG. 18A, an indicator 1810 indicating days for which a user has worked in a month may be displayed on an outer side of a screen of the display unit 351. In addition, when the user clockwise turns the wheel 400, a schedule of a day corresponding to a degree to which the wheel 400 is turned may be displayed on a circle 1800 arranged on an inner side of the screen of the display unit 351.

In addition, referring to FIG. 18B, when the user clockwise turns the wheel 400, an indicator 1820 indicating each month may be displayed outward from the indicator 1810 indicating days (thirty days) for which the user has worked in a month. In addition, when the user clockwise turns the wheel 400, a schedule of a month corresponding to a degree to which the wheel 400 is turned and a schedule of a day included in the month may be displayed on the circle 1800 arranged on the inner side of the screen of the display unit 351.

Likewise, referring to FIG. 18C, when the user clockwise turns the wheel 400, an indicator 1830 indicating a predetermined year may be displayed outward from the indicator 1820 indicating each month. In addition, when the user clockwise turns the wheel 400, a schedule of a year corresponding to a degree to which the wheel 400 is turned, a schedule of a month included in the year, and a schedule of a day included in the month may be displayed on the circle 1800 arranged on the inner side of the screen of the display unit 351.

In this way, the user can broaden a time range to check schedules, events, and/or the like corresponding to several years. In an embodiment, events from a born day to the present day may be briefly displayed by using a plurality of indicators. As described above, according to at least one of the embodiments of the present invention, various pieces of visual information may be displayed by turning the wheel. Moreover, according to at least one of the embodiments of the present invention, various control commands may be executed by the wheel, and thus, watch type terminals having a limited size are effectively controlled.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type terminal comprising:
   a body;
   a display unit disposed on a front surface of the body;
   a wheel surrounding an outer side of the body, and configured to be turned along the outer side of the body; and
   a controller configured to:
   receive a first input of turning the wheel to a first angle in a clockwise or counterclockwise direction,
   select a specific time range corresponding to the first angle formed by turning the wheel in the clockwise or counterclockwise direction,
   receive a second input of turning the wheel to a second angle greater than the first angle in the clockwise or counterclockwise direction while the specific time range is selected,
   enlarge information corresponding to the selected specific time range and display the enlarged information in a first region on the display unit corresponding to the second angle, and
   reduce information corresponding to a time range other than the selected specific time range and display the reduced information in a second region on the display unit excluding the first region.

2. The watch type terminal of claim 1, wherein the controller is further configured to:
   display a first circle corresponding to a first type of event and a second circle corresponding to a second type of event different than the first type of event on the display unit,
   display a first time indicator indicating a first time on the first circle corresponding to a first event of the first type that occurred on the watch type terminal, and
   display a second time indicator indicating a second time on the second circle corresponding to a second event of the second type that occurred on the watch type terminal.

3. The watch type terminal of claim 2, wherein the controller is further configured to:
   display a first icon representing the first event on the first circle at a position of the first time, and
   display a second icon representing the second event on the second circle at a position of the second time.

4. The watch type terminal of claim 2, wherein the controller is further configured to:
   display the first circle without displaying the second circle in response to the wheel being turned a first angle in a first direction, and display the second circle without displaying the first circle in response to the wheel being turned a second angle in the first direction.

5. The watch type terminal of claim 2, wherein the controller is further configured to:
display the first circle without displaying the second circle in response to the wheel being turned in a clockwise direction, and
display the second circle without displaying the first circle in response to the wheel being turned in a counter clockwise direction.

6. The watch type terminal of claim 2, wherein the controller is further configured to:
display a first portion of the first circle corresponding to the first time of the first event with a first color, and
display a second portion of the first circle corresponding to another event of the first type with a second color different than the first color.

7. The watch type terminal of claim 1, wherein the controller is further configured to:
display a plurality of icons representing applications on the watch type terminal in a circle on the display unit and display a first icon among the plurality of icons in a center area of the circle,
display the plurality of icons as moving around the circle in a first direction in response to the wheel being turned in the first direction, and
display a second icon among the plurality of icons in the center area of the circle in response to the wheel no longer being turned in the first direction.

8. The watch type terminal of claim 1, wherein the controller is further configured to:
display a plurality of objects generated during a predetermined first period, and
display objects generated during a second period included in the predetermined first period among the generated plurality of objects, in response to the wheel being turned.

9. The watch type terminal of claim 1, wherein the controller is further configured to set a user input value associated with a predetermined application, based on the angle and the direction by which the wheel is turned.

10. The watch type terminal of claim 9, wherein the controller is further configured to display information on the display unit corresponding to the set user input value.

11. The watch type terminal of claim 1, wherein the controller is further configured to:
display a first time-changing information value on the display unit for a first time, and
display a second time-changing information value on the display unit for a second time based on the angle and the direction by which the wheel is turned.

12. The watch type terminal of claim 1, wherein the controller is further configured to enlarge information displayed on a certain region of the display unit, based on a user input that selects the certain region, and the angle and the direction by which the wheel is turned.

13. The watch type terminal of claim 1, wherein the controller is further configured to display second visual information while first visual information is being displayed, based on the angle and the direction by which the wheel is turned.

14. The watch type terminal of claim 13, wherein the controller is further configured to again display the first visual information while the second visual information is being displayed, based on the angle and the direction by which the wheel is turned.

15. A method of controlling a watch type terminal having a body; a display unit disposed on a front surface of the body; and a wheel surrounding an outer side of the body, and configured to be turned along the outer side of the body, the method comprising:
receiving, via a controller of the watch type terminal, a first input of turning the wheel to a first angle in a clockwise or counterclockwise direction;
selecting, via the controller, a specific time range corresponding to the first angle formed by turning the wheel in the clockwise or counterclockwise direction;
receiving, via the controller, a second input of turning the wheel to a second angle greater than the first angle in the clockwise or counterclockwise direction while the specific time range is selected;
enlarging information, via the controller, corresponding to the selected specific time range and displaying the enlarged information in a first region on the display unit corresponding to the second angle; and
reducing information, via the controller, corresponding to a time range other than the selected specific time range and displaying the reduced information in a second region on the display unit excluding the first region.

16. The method of claim 15, further comprising:
displaying a first circle corresponding to a first type of event and a second circle corresponding to a second type of event different than the first type of event on the display unit;
displaying a first time indicator indicating a first time on the first circle corresponding to a first event of the first type that occurred on the watch type terminal; and
displaying a second time indicator indicating a second time on the second circle corresponding to a second event of the second type that occurred on the watch type terminal.

17. The method of claim 16, further comprising:
displaying a first icon representing the first event on the first circle at a position of the first time; and
displaying a second icon representing the second event on the second circle at a position of the second time.

18. The method of claim 16, further comprising:
displaying the first circle without displaying the second circle in response to the wheel being turned a first angle in a first direction; and
displaying the second circle without displaying the first circle in response to the wheel being turned a second angle in the first direction.

19. The method of claim 16, further comprising:
displaying the first circle without displaying the second circle in response to the wheel being turned in a clockwise direction; and
displaying the second circle without displaying the first circle in response to the wheel being turned in a counter clockwise direction.

20. The method of claim 16, further comprising:
displaying a first portion of the first circle corresponding to the first time of the first event with a first color; and
displaying a second portion of the first circle corresponding to another event of the first type with a second color different than the first color.

* * * * *